(12) United States Patent
Savicki, Jr. et al.

(10) Patent No.: US 7,510,429 B1
(45) Date of Patent: *Mar. 31, 2009

(54) ELECTRICAL WIRING SYSTEM WITH SLIDE-IN CONNECTOR

(75) Inventors: Gerald R. Savicki, Jr., Canastota, NY (US); Ralph Baldwin, Central Square, NY (US)

(73) Assignee: Pass & Seymour, Inc., Syracuse, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/678,283

(22) Filed: Feb. 23, 2007

Related U.S. Application Data

(63) Continuation-in-part of application No. 11/274,817, filed on Nov. 15, 2005, now Pat. No. 7,407,410, which is a continuation of application No. 10/680,797, filed on Oct. 7, 2003, now Pat. No. 6,994,585.

(51) Int. Cl.
*H01R 13/60* (2006.01)

(52) U.S. Cl. .................... 439/535; 439/536; 174/53; 174/58

(58) Field of Classification Search ............ 439/535, 439/536, 650, 352; 174/48, 66, 67, 50, 53, 174/58, 68
See application file for complete search history.

(56) References Cited

U.S. PATENT DOCUMENTS

| | | | |
|---|---|---|---|
| 4,273,957 A | 6/1981 | Kolling, Jr. | |
| 4,477,141 A | 10/1984 | Hardesty | |
| 4,725,249 A | 2/1988 | Blackwood et al. | |
| 6,457,988 B1 * | 10/2002 | Andersen | 439/373 |
| 7,407,410 B1 * | 8/2008 | Benoit et al. | 439/535 |

* cited by examiner

*Primary Examiner*—Tho D Ta
(74) *Attorney, Agent, or Firm*—Daniel P. Malley; Bond, Schoeneck & King, PLLC

(57) ABSTRACT

The present invention is directed to an electrical wiring system for use in an electrical distribution system including at least one electric circuit. The at least one electric circuit includes a plurality of electric power transmitting wires disposed between an electric power source interface and at least one electrical device location. The system includes an electrical wiring device disposed at the at least one electrical device location. The electrical wiring device includes a predefined coupling area having a plurality of electrical wiring device contacts disposed therein. A connector assembly includes a plurality of electrical connector contacts disposed therein. The connector assembly is configured to be directly connected to the plurality of electrical power transmitting wires such that electrical continuity is established between the plurality of electrical power transmitting wires and the plurality of electrical connector contacts. The connector assembly is also configured to be disposed in a contacting relationship with the predefined coupling area of the electrical wiring device such that electrical continuity is established between the plurality of electrical connector contacts and the plurality of electrical wiring device contacts.

60 Claims, 17 Drawing Sheets

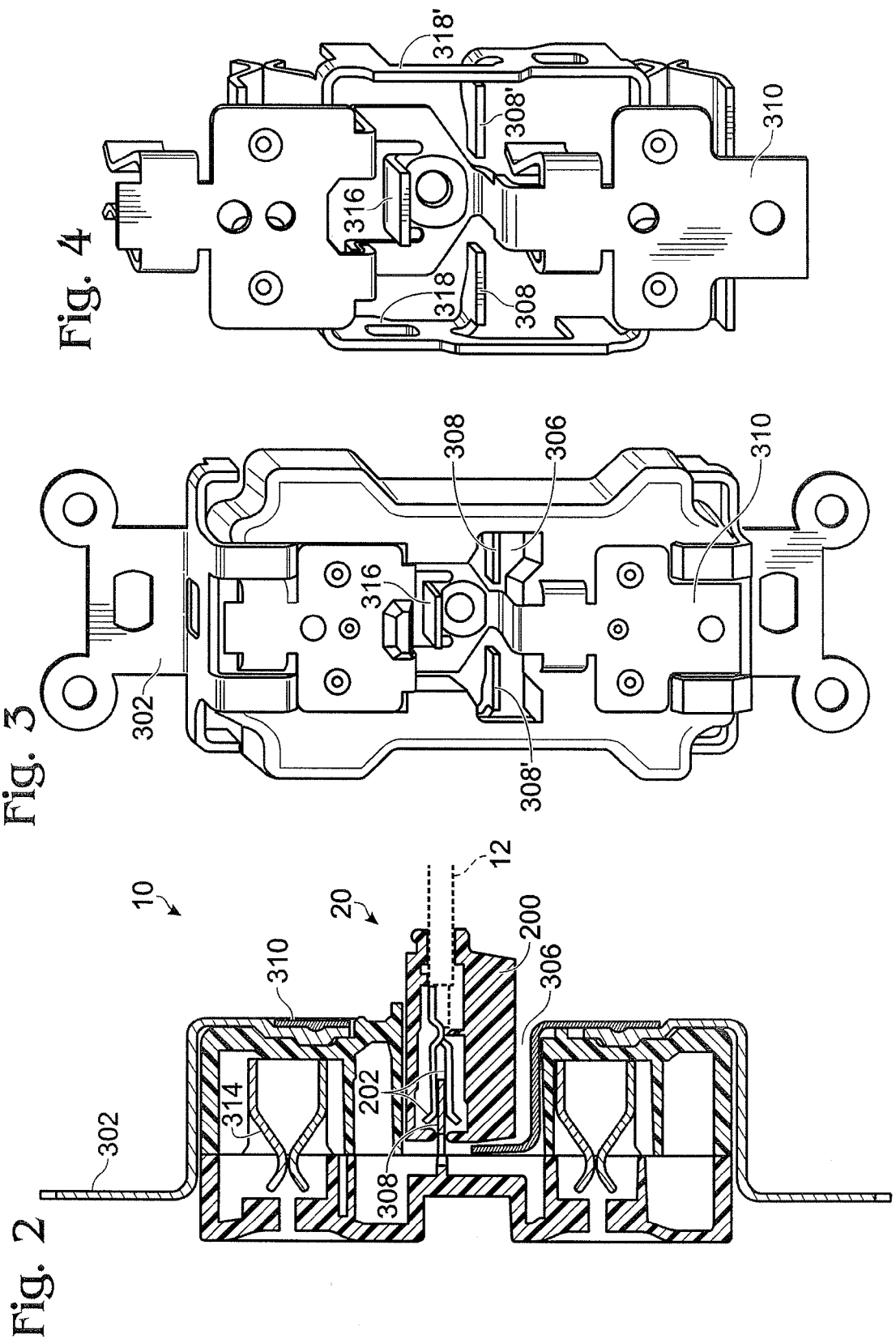

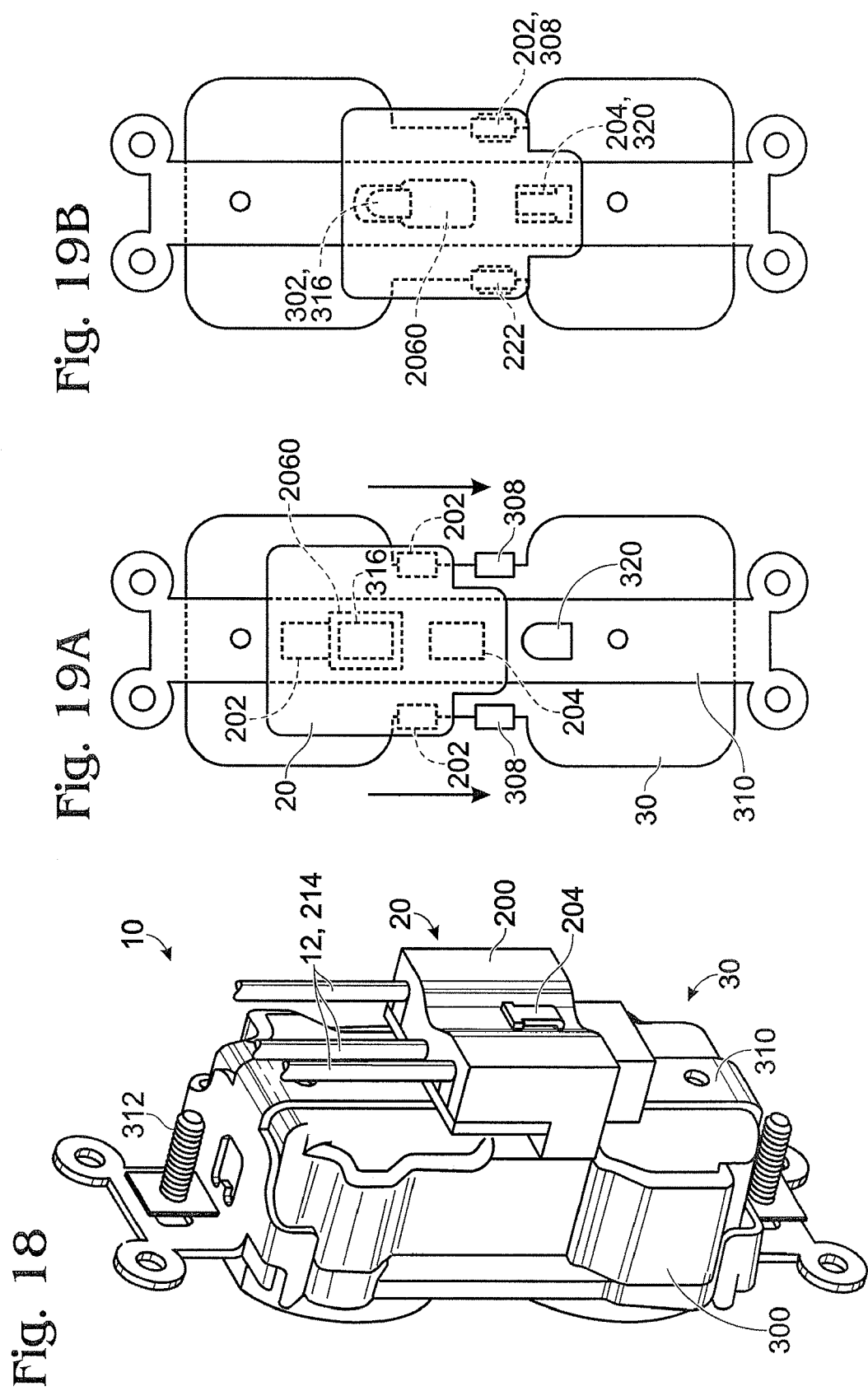

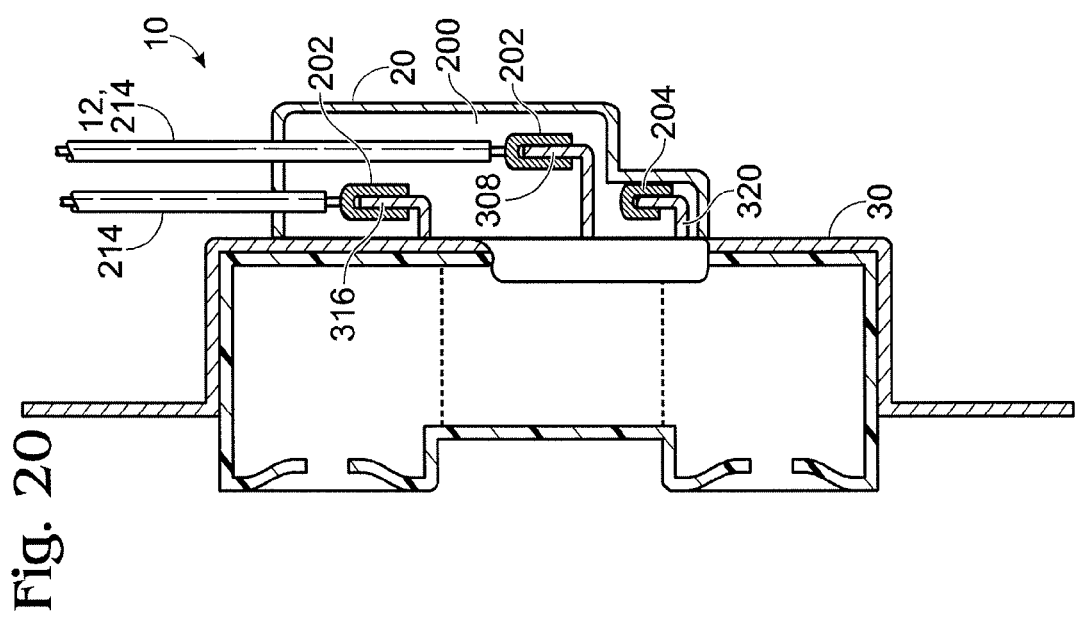
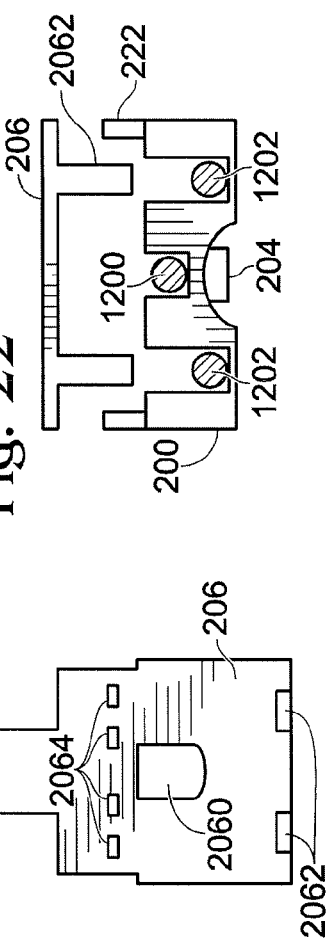
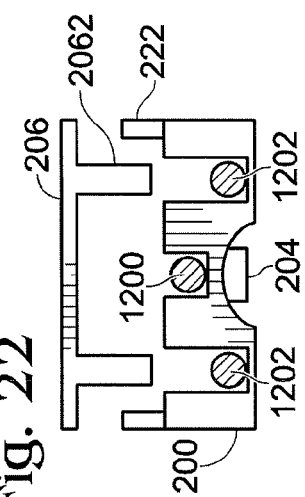
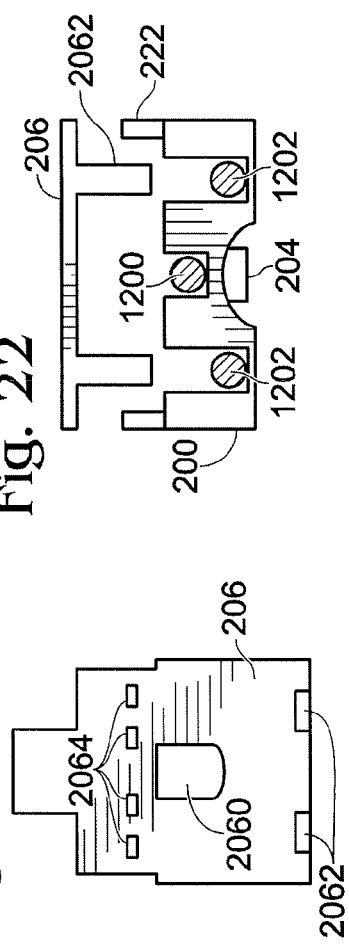

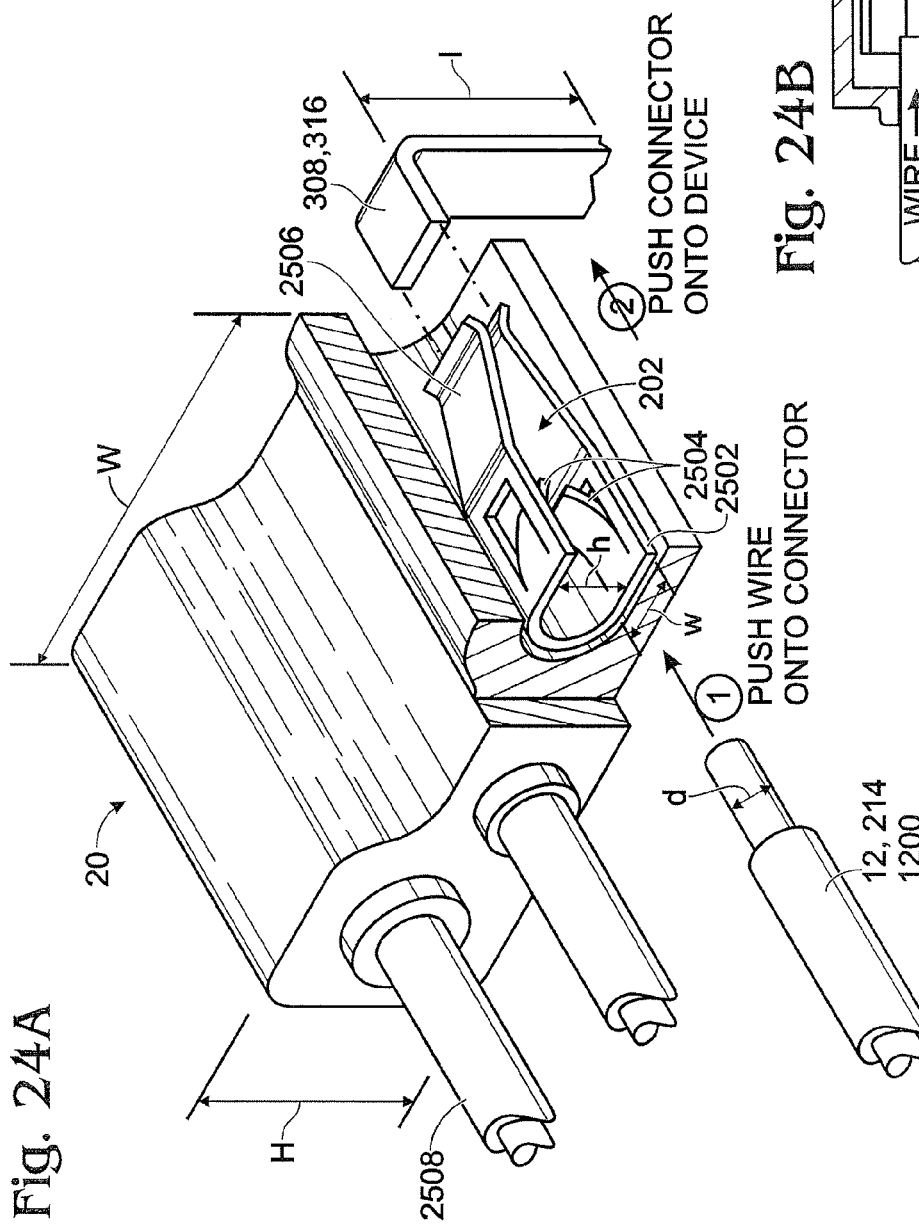
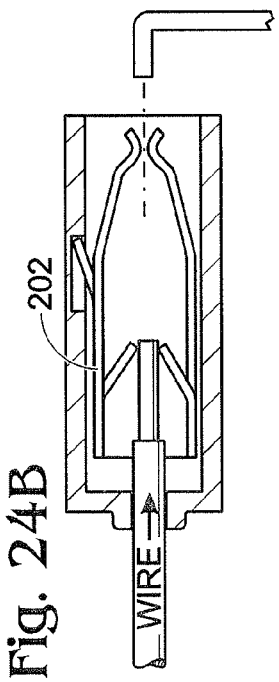
Fig. 24A
Fig. 24B

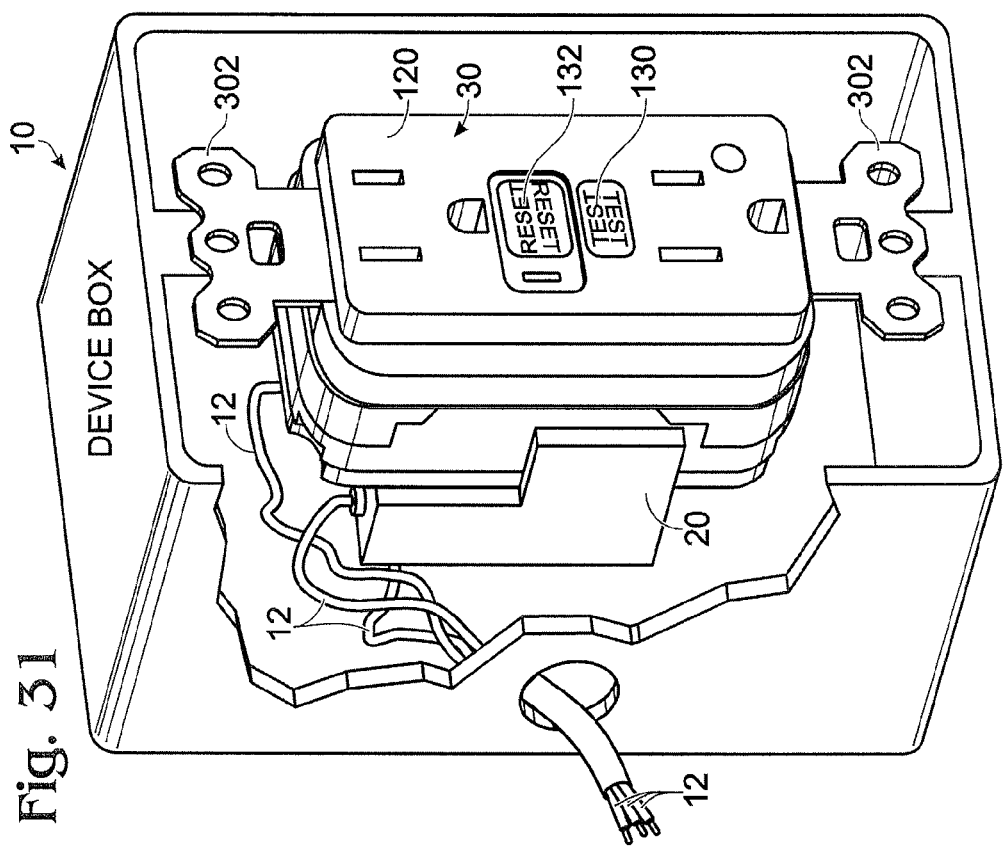
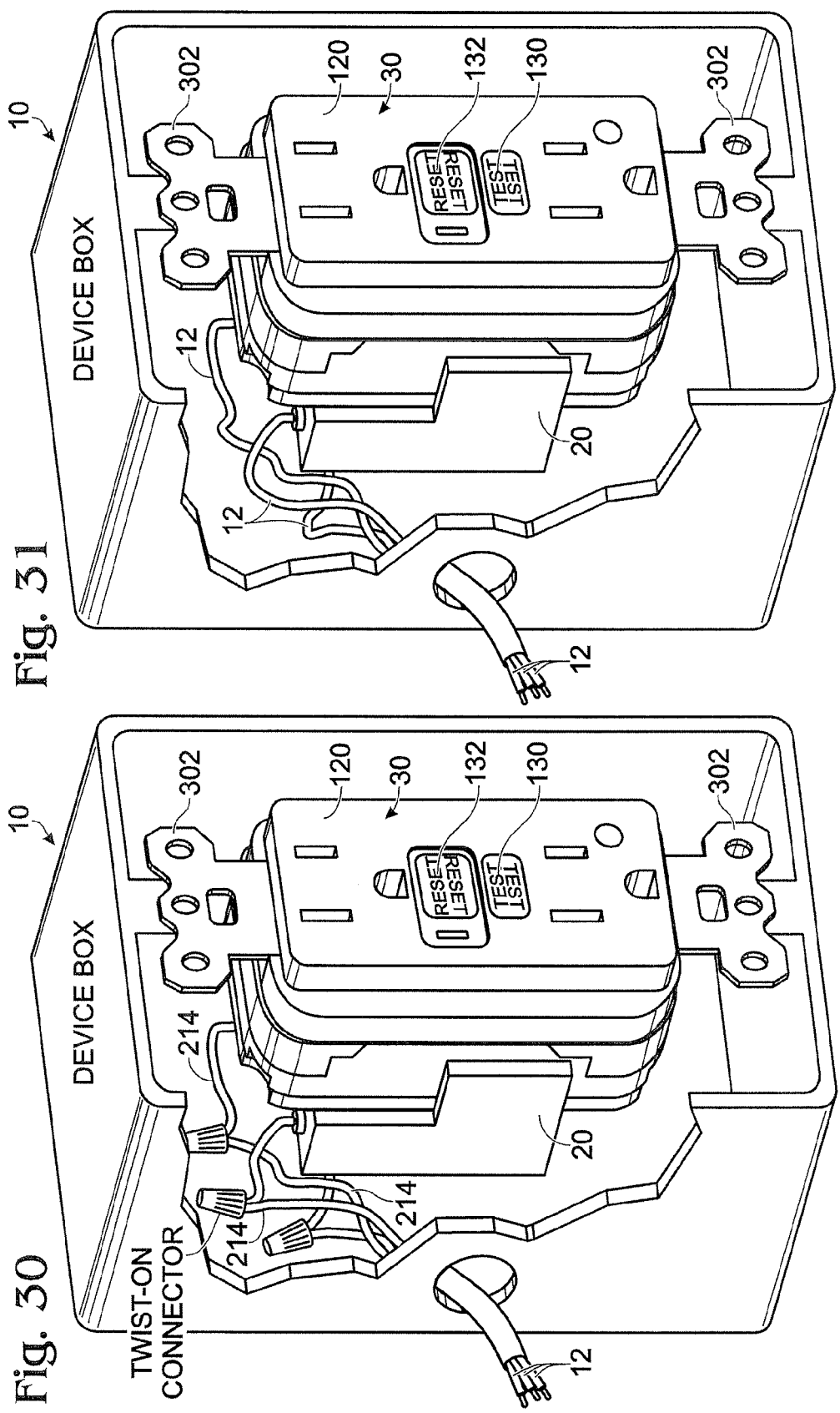

ELECTRICAL WIRING SYSTEM WITH SLIDE-IN CONNECTOR

CROSS-REFERENCE TO RELATED APPLICATIONS

This is a continuation-in-part application of U.S. patent application Ser. No. 11/274,817, filed on Nov. 15, 2005 which is a continuation application of U.S. patent application Ser. No. 10/680,797, now U.S. Pat. No. 6,994,585 filed on Oct. 7, 2003, the contents of which are relied upon and incorporated herein by reference in their entirety, and the benefit of priority under 35 U.S.C. §120 is hereby claimed.

BACKGROUND OF THE INVENTION

1. Field of the Invention

The present invention relates generally to electrical circuit installation, and particularly to electrical devices that facilitate installation of electrical circuits in a building or some other structure.

2. Technical Background

Installing electrical circuits in buildings and/or other structures is typically labor intensive, time-consuming, and a process that requires electricians of various skill levels. As a result the installation process is expensive. The first phase of the installation is commonly referred to as the "rough-in" phase. In new construction, wiring is often bundled in cables, armored cables, or conduit and disposed throughout the structure in accordance with the building plans. This wiring is referred to as premise wiring. Junction boxes are installed at appropriate locations. Brackets and device boxes are installed throughout the structure where electrical service is desired. Junction boxes, of course, are employed to house the connection point, or junction, of several conductors. Device boxes are used to accommodate electrical wiring devices. For example, the types of electrical wiring devices may include, but are not limited to, receptacles, switches, dimmers, GFCIs, transient voltage surge suppressors (TVSS), timer devices, sensors of various types, thermostats, lighting fixtures, communication devices, and/or combinations thereof. After the device boxes are placed, the premise wires are inserted through openings in the box. At this point, the electrical wires extend from the boxes and are visible and accessible for the next phase of the installation process.

Before discussing the next phase of the process, it is noted that electrical cables may include two to five conductive wires. For example, in a structure that requires high power, the most common way of distributing that power is by employing the three-phase power system. As those of ordinary skill in the art recognize, five wires are employed. Three phase power includes three "hot" or "live" wires. Each of these wires transmits electrical power that is 120 degrees out of phase with the other two hot wires. The other two wires are the neutral conductor and the ground wire. Three phase power typically comes from the power utility via four wires: the three-phase wires, and the neutral. If the current flowing through each of the phases is equal, no current will flow through the neutral. The neutral wire is typically connected to the building ground at the structure's main distribution panel. The five wire cable is distributed from the central panel. Some of the circuits in the structure are designed to provide power to grounded equipment. These circuits may employ three wires, a line conductor (hot wire), a neutral conductor, and a ground. Some circuits may only employ two wires, the line conductor and the neutral conductor. Other circuits may employ two line conductors and a ground conductor. Other circuits may employ a combination of wires for distributing electrical power and low voltage. Low voltage wiring has commonly been employed for communication, computers, telephony, security, lighting systems, climate control, or electrical power control systems.

Referring back to the installation process, after the "rough-in" phase has been completed, the electrical wiring devices are terminated, i.e., the premise wires are electrically connected to terminals on the electrical wiring device. The electrical wiring device is then installed to the device box. The termination process is the most costly and time consuming part of the installation. A journeyman electrician must perform, or supervise, the connection of each wiring device in the structure. During this process, each electrical wire must be stripped and terminated to the device. What is needed is an efficient, labor-saving, and cost effective means for terminating the electrical wires and coupling them to the individual wiring devices.

SUMMARY OF THE INVENTION

The present invention addresses the problems described above. The present invention is directed to an electrical wiring system that simplifies the installation process. Further, the present invention provides an efficient system and method for terminating electrical devices. The system and method is cost-effective because it eliminates many of the labor intensive practices that are currently in use.

One aspect of the present invention is an electrical wiring system for use in an electrical distribution system including at least one electric circuit. The at least one electric circuit includes a plurality of electric power transmitting wires disposed between an electric power source interface and at least one electrical device location. The system includes an electrical wiring device disposed at the at least one electrical device location. The electrical wiring device includes a predefined coupling area having a plurality of electrical wiring device contacts disposed therein. A connector assembly includes a plurality of electrical connector contacts disposed therein. The connector assembly is configured to be directly connected to the plurality of electrical power transmitting wires such that electrical continuity is established between the plurality of electrical power transmitting wires and the plurality of electrical connector contacts. The connector assembly is also configured to be disposed in a contacting relationship with the predefined coupling area of the electrical wiring device such that electrical continuity is established between the plurality of electrical connector contacts and the plurality of electrical wiring device contacts.

In another aspect, the present invention is directed to a method for installing an electrical wiring system for use in an electrical distribution system including at least one electric circuit, the at least one electric circuit including a plurality of electric power transmitting wires disposed between an electric power source interface and at least one electrical device location. The method includes the steps of disposing an electrical wiring device at the at least one electrical device location, the electrical wiring device including a predefined coupling area having a plurality of electrical wiring device contacts disposed therein; providing a connector assembly including a plurality of electrical connector contacts disposed therein; connecting the connector assembly to the plurality of electrical power transmitting wires such that electrical continuity is established between the plurality of electrical power transmitting wires and the plurality of electrical connector contacts; and positioning the connector assembly in a contacting relationship with the predefined coupling area of the electrical wiring device to thereby establish electrical continuity between the plurality of electrical connector contacts and the plurality of electrical wiring device contacts.

In yet another aspect, the present invention is directed to an electrical wiring system for use in an electrical distribution system including at least one electric circuit. The at least one electric circuit includes a plurality of premise wires disposed between an electric power source interface and at least one electrical device location. The system includes an electrical wiring device disposed at the at least one electrical device location. The electrical wiring device includes a predefined coupling area having a plurality of electrical wiring device contacts disposed therein. A connector assembly includes a plurality of electrical connector contacts disposed therein. The connector assembly is configured to be connected to each of the plurality of premise wires at corresponding connection points such that electrical continuity is established between the plurality of premise wires and the plurality of electrical connector contacts. The connector assembly is also configured to be disposed in a contacting relationship with the predefined coupling area of the electrical wiring device such that electrical continuity is established between the plurality of electrical connector contacts and the plurality of electrical wiring device contacts.

In yet another aspect, the present invention is directed to an electrical wiring system for use in an electrical distribution system including at least one electric circuit. The at least one electric circuit includes a plurality of electric power transmitting wires having a first end portion connected to an electric power source interface and a second end portion disposed at least one electrical device location. A device box having a wiring egress aperture and an interior volume is disposed at the at least one electrical device location. The system includes an electrical wiring device configured to be mounted on the device box. The electrical wiring device includes a predefined coupling area having a plurality of electrical wiring device contacts disposed therein. A connector assembly includes a plurality of electrical connector contacts disposed therein. The connector assembly is configured to be connected to the plurality of electrical power transmitting wires such that electrical continuity is established between the plurality of electrical power transmitting wires and the plurality of electrical connector contacts within the interior volume. The connector assembly is configured to be disposed in a contacting relationship with the predefined coupling area of the electrical wiring device such that electrical continuity is established between the plurality of electrical connector contacts and the plurality of electrical wiring device contacts.

In yet another aspect, the present invention is directed to an electrical wiring system for use in an electrical distribution system including at least one electric circuit. The at least one electric circuit includes a plurality of electric power transmitting wires disposed between an electric power source interface and at least one electrical device location. The system includes an electrical wiring device disposed at the at least one electrical device location. The electrical wiring device includes a predefined coupling area having a plurality of electrical wiring device contacts disposed therein. A connector assembly includes a plurality of electrical connector contacts disposed in an interior portion of the assembly. A plurality of wire leads connected to the plurality of electrical connector contacts extend from the contacts to an exterior portion of the connector assembly. The plurality of wire leads disposed at the exterior portion are configured to be connected to corresponding wires of the plurality of electrical power transmitting wires at corresponding connection points, such that electrical continuity is established between the plurality of electrical power transmitting wires and the plurality of electrical connector contacts. The connector assembly is also configured to be disposed in a contacting relationship with the predefined coupling area of the electrical wiring device such that electrical continuity is established between the plurality of electrical connector contacts and the plurality of electrical wiring device contacts.

In yet another aspect, the present invention is directed to an electrical wiring system for use in an electrical distribution system including at least one electric circuit. The at least one electric circuit includes a plurality of electric power transmitting wires disposed between an electric power source interface and at least one electrical device location. The system includes an electrical wiring device disposed at the at least one electrical device location. The electrical wiring device includes a predefined coupling area having a plurality of electrical wiring device contacts disposed therein being disposed on a major rear surface of the electrical wiring device. A connector assembly includes a plurality of electrical connector contacts disposed therein. The connector assembly is configured to be connected to the plurality of electrical power transmitting wires such that electrical continuity is established between the plurality of electrical power transmitting wires and the plurality of electrical connector contacts. The connector assembly is also configured to be disposed in a contacting relationship with the predefined coupling area of the electrical wiring device such that electrical continuity is established between the plurality of electrical connector contacts and the plurality of electrical wiring device contacts.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

BRIEF DESCRIPTION OF THE DRAWINGS

FIG. 2 is a cross-sectional view of the electrical wiring system depicted in FIG. 1B;

FIG. 3 is a back view of the wiring device depicted in FIG. 1A and FIG. 1B, showing a power input receptacle;

FIG. 4 is a detail view illustrating the construction of the receptacle depicted in FIG. 3;

FIG. 18 is a perspective view of the electrical wiring system depicted in FIG. 16 in a latched position;

FIGS. 19A-19B are plan views of the electrical wiring system shown in FIGS. 16-18 and illustrate connector assembly movement from the registered position to the latched position;

FIG. 20 is cross-sectional view of the electrical wiring system depicted in FIGS. 16-19 illustrating the latched position;

FIG. 21A is a plan view of the cover portion of the connector assembly in accordance with an embodiment of the present invention;

FIG. 21B is a plan view of an internal portion of the body member of the connector assembly in accordance with an embodiment of the present invention;

FIG. 22 is a side view of the connector assembly in accordance with the embodiments depicted in FIGS. 21A-21B;

FIGS. 24A-B are perspective views of a connector assembly including feed-through terminals in accordance with another embodiment of the present invention;

FIG. 30 is a perspective view of the electrical wiring device in accordance with any of the embodiments depicted in FIGS. 1-29; and FIG. 31 is a perspective view of the electrical wiring device in accordance with yet another embodiment of the present invention.

DETAILED DESCRIPTION

Figure 1A:
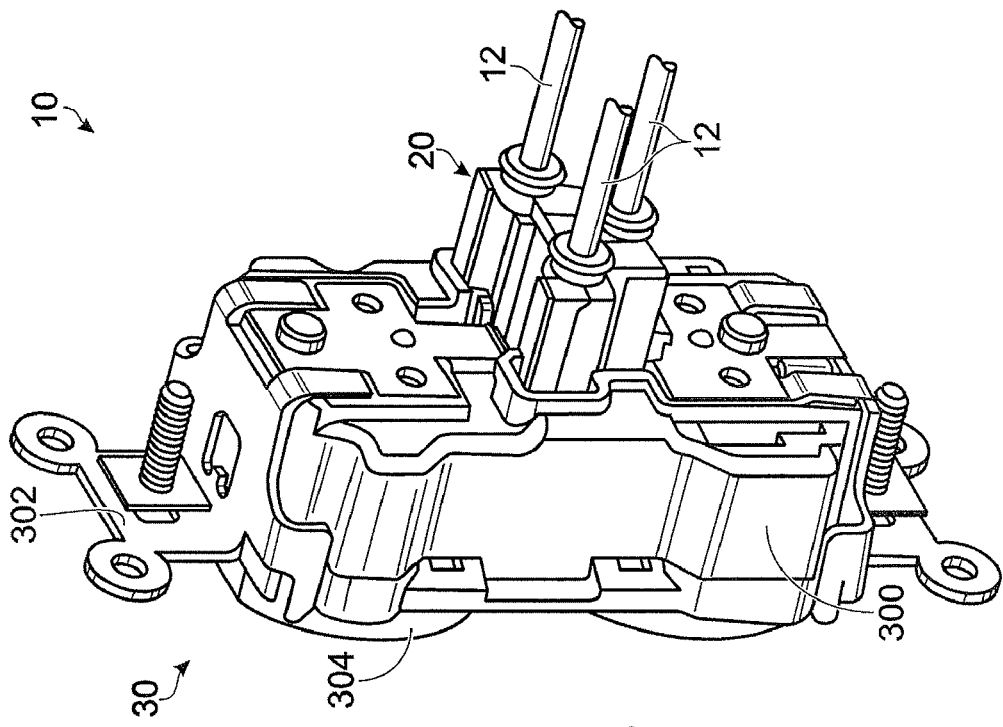
FIGS. 1A and 1B are perspective views of the electrical wiring system in accordance with the present invention.

Reference will now be made in detail to the present exemplary embodiments of the invention, example of which are illustrated in the accompanying drawings. Wherever possible, the same reference numbers will be used throughout the drawings to refer to the same or like parts. An exemplary embodiment of the electrical wiring system of the present invention is shown in FIG. 1, and is designated generally throughout by reference numeral 10.

Figure 1B:
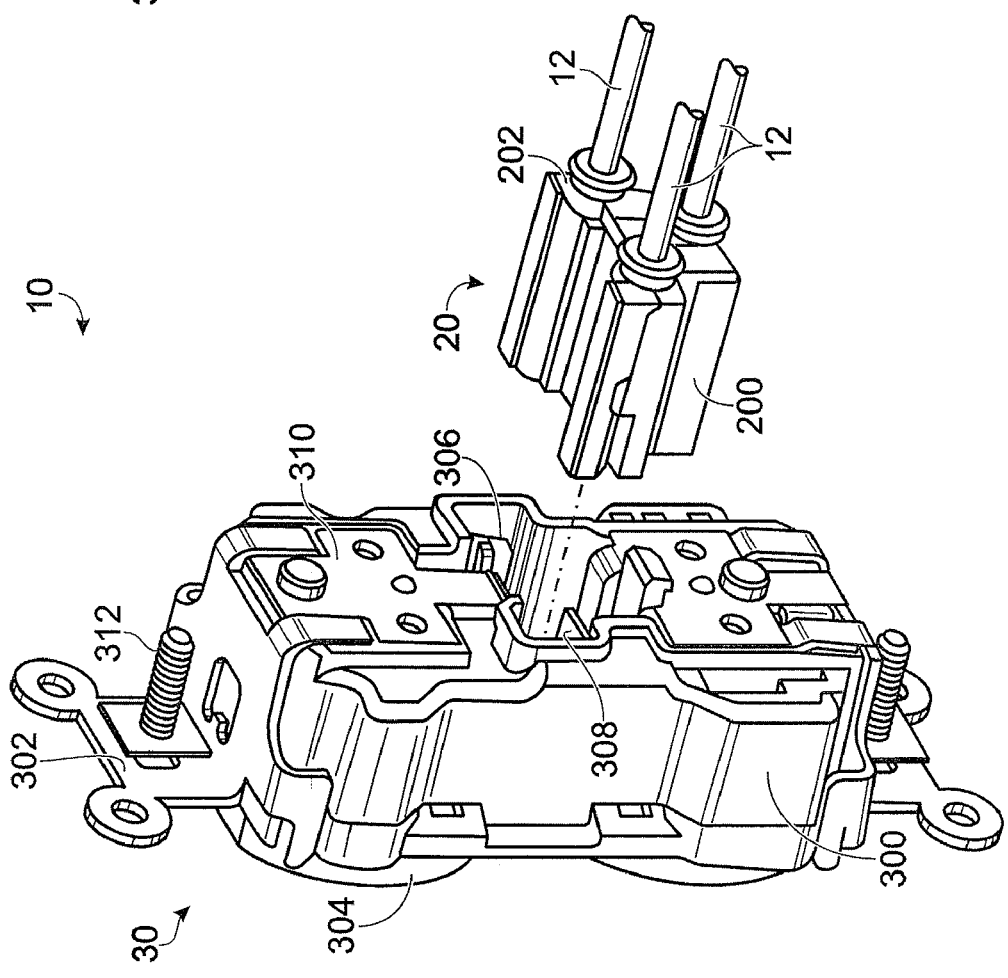

As embodied herein, and depicted in FIGS. 1A and 1B, perspective views of the electrical wiring system 10 in accordance with the present invention are disclosed. Of course, electrical wiring system 10 is disposed inside of a device box (not shown). Referring to FIG. 1A, electrical wiring system 10 includes plug connector 20 which mates with electrical wiring device 30. The lead ends of premise wires 12 are terminated at plug 20. Plug 20 includes a housing 200 and contacts 202, which are disposed within body 200. In the embodiment shown, connector contacts 202 are female contacts designed to accept male contacts disposed within wiring device 30. In one embodiment, housing 200 is formed from molded plastic, polycarbonate, or other polymer based materials. Examples of such molding processes include, but are not limited to, thermoset molding, thermoplastic molding, blow-molding, vacuum molding, or casting. Connector contacts 202 are typically fabricated using a copper alloy material. Those of ordinary skill in the art will recognize that any suitable material may be employed in fabricating plug connector 20.

Electrical wiring device 30 includes a body 300, strap element 302, cover 304, power input receptacle 306, receptacle contacts 308, ground chassis 310, and mounting screws 312. In this embodiment, receptacle contact 308 is a male contact that is configured to mate with plug contact 202. Body 300 and cover 304 are injection molded components, again, using materials such as polymers, polycarbonate, or nylon materials. Contacts 308 are fabricated using copper alloy materials. Strap 302 may be fabricated using a copper alloy or by using plated steel. Ground chassis 310 is fabricated using a copper alloy. Because the embodiment shown is a 3-wire system that includes ground, ground chassis 310 includes a male contact tab that mates with one of the female contacts in plug 20.

In the example depicted in FIG. 1A and FIG. 1B, three wires are shown being terminated by plug 20. However, those of ordinary skill in the art will recognize that the present invention should not be construed as being limited to the embodiment shown. The present invention may be configured to accommodate 2 wire systems and three-phase (5 wires) systems, as well as the 3-wire system shown. Further, system 10 of the present invention may be adapted to a wiring system that employs more than 5 wires. While wires are shown being terminated by a single plug 20, those of ordinary skill in the art will recognize that the present invention may be configured to terminate the wires separately or in combination, within a plurality of plugs.

Referring to FIG. 2, a cross-sectional view of the electrical wiring system depicted in FIG. 1B is disclosed. Plug connector housing 200 fits within input receptacle 306. As such, male contact 308 is shown as being inserted between female contacts 202. FIG. 2 also shows power output receptacle 314, which is configured to receive the blade contacts from a plug. When plug 20 is installed in device 30, electrical continuity is established between the plurality of wires 12 and the wiring device. Thus, when wires 12 are energized, power is supplied to output receptacles 314. Those of ordinary skill in the art will recognize that while the example of FIGS. 1A and 1B shown a wiring device that provides output receptacles 314, the present invention may be practiced with any suitable type of wiring device. For example, wiring device 30 may include a switch, a dimmer switch, a GFCI, a transient voltage surge suppressor (TVSS), a timer mechanism, an occupancy sensor or other type of sensor, a thermostat, a night light, a lighting fixture, a low voltage control device, or a device that includes a combination of the above.

Figure 6:
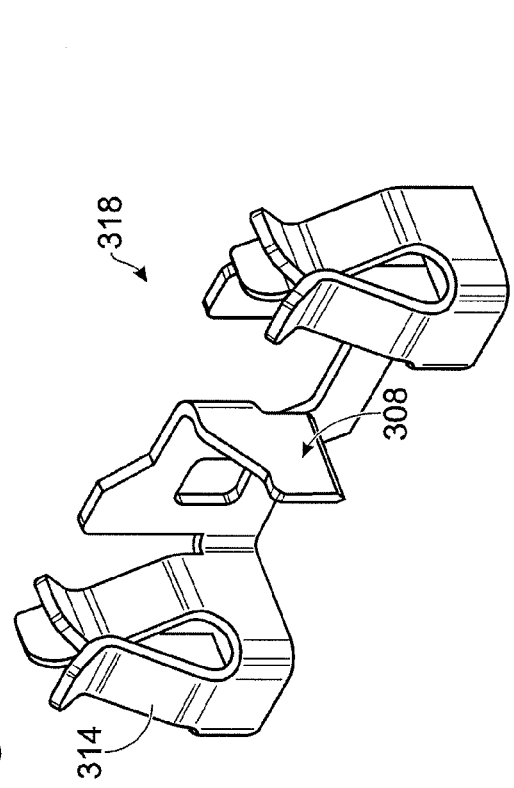
FIG. 6 is a detail view of an electrical contact body employed in the wiring device receptacle in accordance with the present invention.
Figure 5:
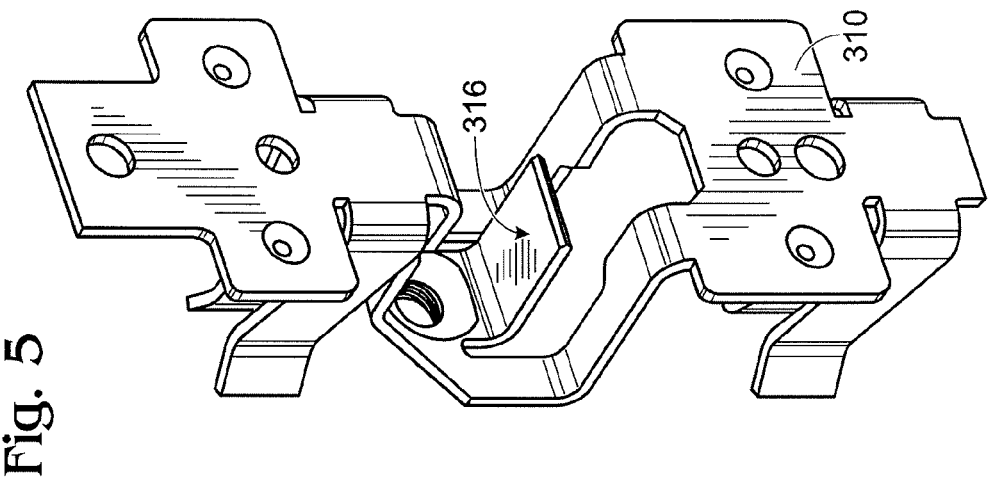
FIG. 5 is a detail view of the wiring device ground chassis in accordance with the present invention.

Referring to FIG. 3, a back view of the wiring device depicted in FIG. 1A and FIG. 1B is disclosed. As shown, receptacle 306 is shaped to accommodate plug connector 20. Receptacle 306 includes male contacts 308 and ground contact 316. Referring to FIG. 4, a detail view illustrating the construction of receptacle 306 is shown. Essentially, the contacts within receptacle 306 are formed by three metallic bodies disposed within molded body 300 (see FIG. 1A). As discussed above, ground chassis 310 includes ground contact 316. Contact body 320 includes contact 308 and supporting structure. Contact body 318' is a mirror image of contact body 320', and includes contact 308'. During fabrication, ground chassis 310 is inserted into a first side of molded body 300, and contact bodies 320, 320' are inserted into the opposing side of body 300, such that contacts 308, 308', and 316 from an integrated set of male contacts suitable for female plug connector 20. FIG. 5 is a detail view showing ground chassis 310 in isolation. FIG. 6 is a detail view of electrical contact body 320 in isolation.

Figure 7:
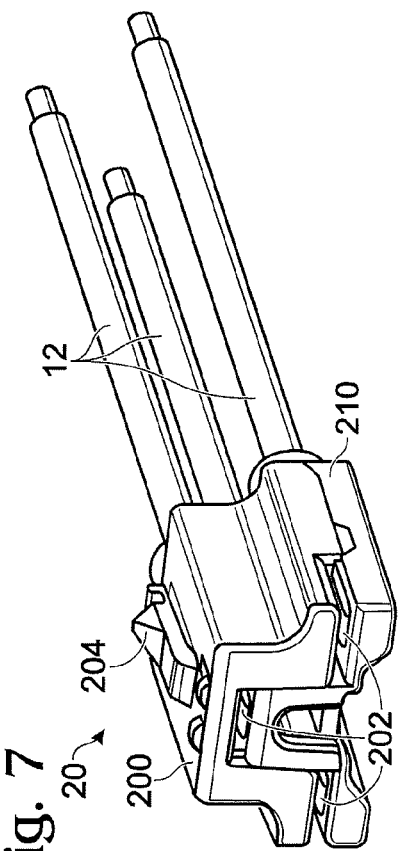
FIG. 7 is a perspective view of the plug connector in accordance with a first embodiment of the present invention.

As embodied herein and depicted in FIG. 7, perspective view of plug connector 20 in accordance with a first embodiment of the present invention is disclosed. Plug connector 20 includes upper housing 200 and lower housing 210. Upper housing 200 is snapped onto lower housing 210 to thereby enclose and terminate wires 12 in plug connector 20. Upper housing 200 includes latch mechanism 204. When plug connector 20 is inserted into receptacle 306, latch mechanism 204 prevents plug 20 from being pulled out of receptacle 306. Latch mechanism 204 is configured to meet Underwriter's Laboratories (UL) standards for a locking connector. In this case, UL requires that a static pull test of 20 pounds be applied to the connector for one minute. During the test, plug connector 20 may not separate from receptacle 30.

During operation, latch mechanism 204 flexes upon insertion of plug connector 20. The flexure latch mechanism 204 relaxes to a non-flexed position upon successful locking of plug connector 20 to receptacle 306, and emits an audible snapping sound or visual indication that locking has been achieved. Flexible latch mechanism 204 may also be configured to be accessible to the finger or to a tool when plug connector 20 is locked to receptacle 306. In this embodiment, when latch mechanism 204 is accessed and manually flexed manually, or by the tool, plug connector 20 can be removed from receptacle 306. The flexure is oriented in a direction opposite to the insertion direction in order to meet requirements in Underwriters Laboratories (UL) standards. In another embodiment, plug connector 20 can be locked into receptacle 306 using screws or any number of fastening means familiar to those skilled in the art.

Figure 8:
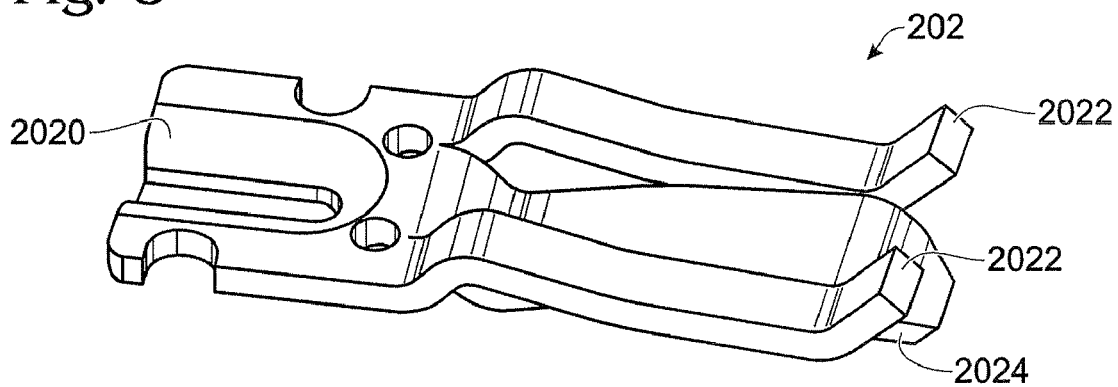
FIG. 8 is a is a detail view of the electrical contacts employed in the plug connector depicted in FIG. 7.

Referring to FIG. 8, a detail view of female electrical contact 202 is depicted. Each contact 202 includes a wire seat portion 2020. Wire seat 2020 accommodates the wire conductor when wire 12 is bonded to contact 202 during termination. Contact 202 also includes two exterior spring contact members 2022, and an interior spring contact member 2024. As those of ordinary skill in the art will appreciate, when a male receptacle contact (308,316) is inserted, the exterior spring contact members 2022 separate from the interior spring contact member 2024, holding contact (308,316) firmly therebetween.

Figure 9:
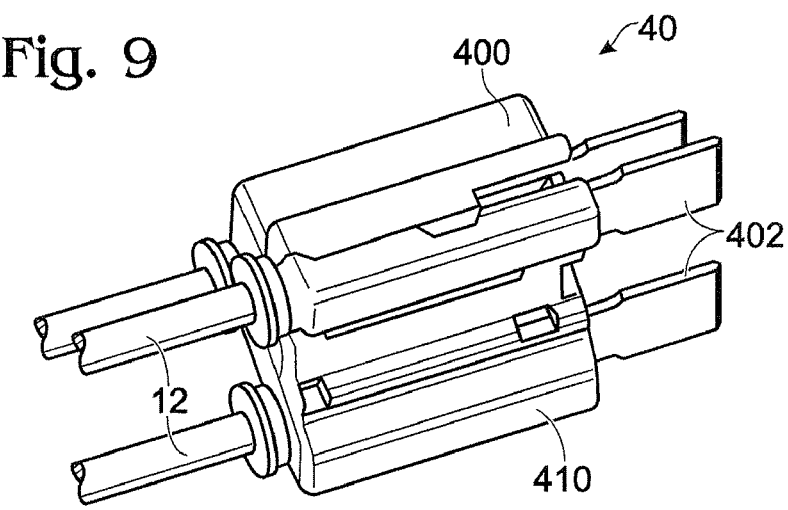
FIG. 9 is a perspective view of the plug connector in accordance with a second embodiment of the present invention.

As embodied herein and depicted in FIG. 9, a perspective view of the plug connector 40 is accordance with a second embodiment of the present invention is disclosed. Plug connector 40 includes upper housing 400 which is mated to lower housing 410. In this embodiment, the female contacts are replaced by male contacts 402. As a result, receptacle 306, disposed in wiring device 30 (not shown), includes female contacts.

Figure 10:
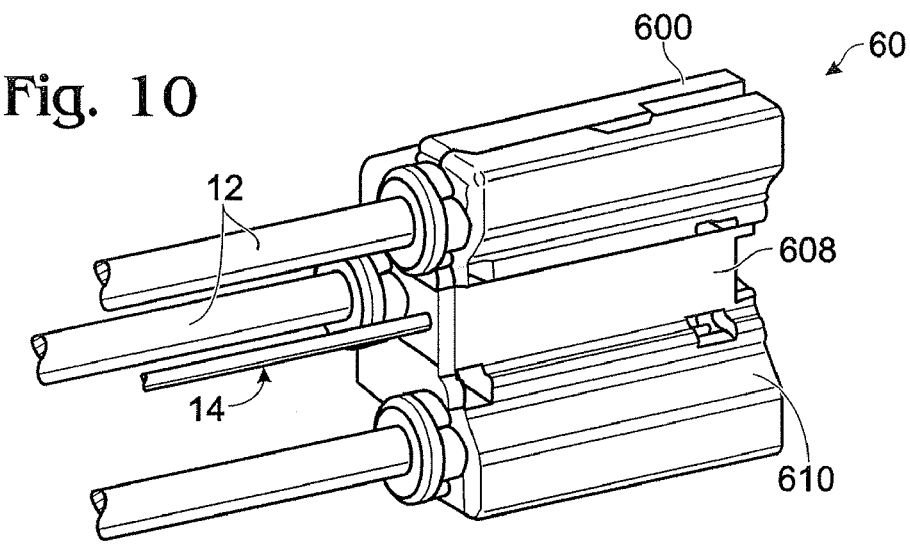
FIG. 10 is a perspective view of the plug connector in accordance with a third embodiment of the present invention.

As embodied herein and depicted in FIG. 10, a perspective view of plug connector 60 is accordance with a third embodiment of the present invention is disclosed. Like the other embodiments, plug connector 60 includes upper housing 600 and lower housing 610. However, this embodiment includes an additional contact that accommodates communications wire 14. Communications wire 14 transmits status data to a receiver disposed in wiring device 30, or transmits status data from a sensor disposed in wiring device 30 to a remote receiver. Any suitable system of transmission may be employed, such as an electrical, optical, acoustic, or RF signal. signal, A transmitter employed by device 30 may generate an RF tag that transmits a fault detect code in the presence of a fault condition.

Figure 11:
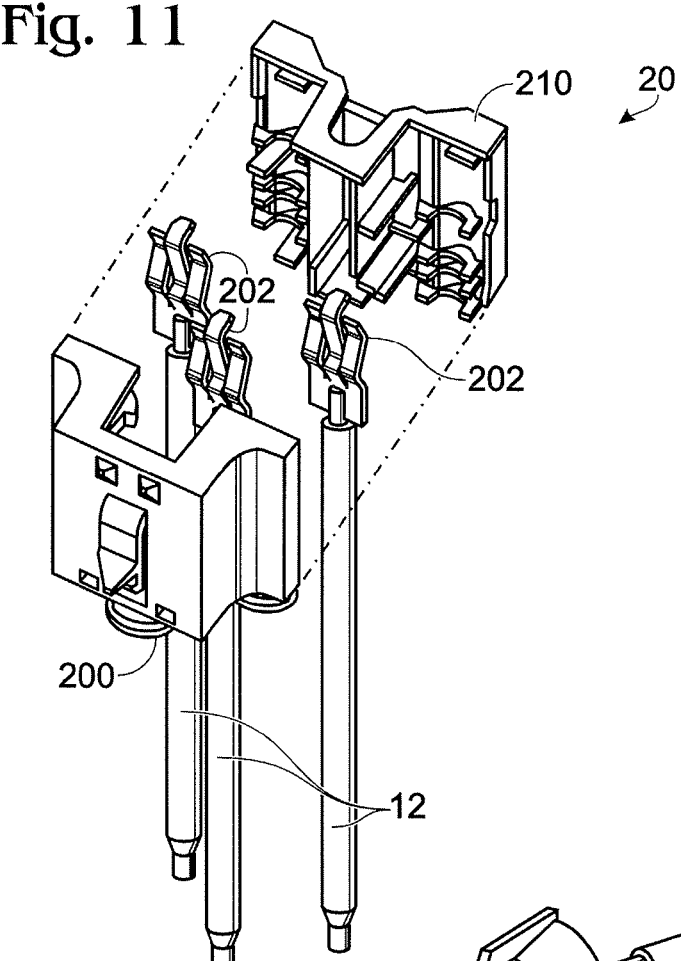
FIG. 11 is an exploded view of the plug connector depicted in FIG. 7, illustrating a first method for terminating the plug connector.

Referring to FIG. 11, an exploded view of the plug connector depicted in FIG. 7 is shown. FIG. 11 illustrates a first method for terminating plug connector 20 to wire 12. After each wire 12 is stripped, it is placed in seat 2020 (See FIG. 8), and bonded to the contact. Each contact 202 is disposed in upper housing 200. Subsequently, lower housing 210 is snapped into place to thereby secure contacts 202. In an alternate embodiment, contacts 202 are disposed in either upper housing 200 or in lower housing 210. Each contact 202 includes a blade element. The blade element is configured to displace insulation disposed on wire 12 when lower housing 210 is snapped onto upper housing 200. The blade element contacts the conductor after the insulation is displaced, such that electrical continuity is established between wire 12 and contact 202.

Figure 12:
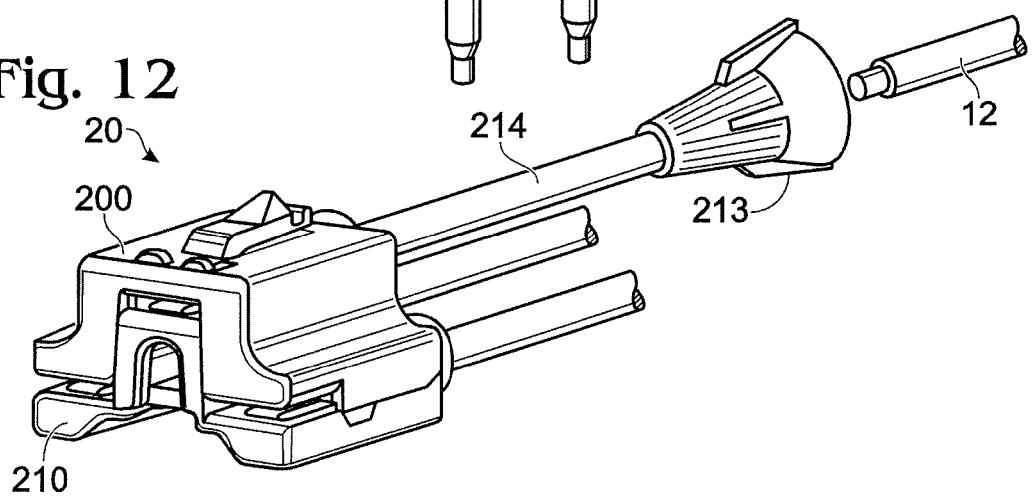
FIG. 12 is a perspective view of the plug connector depicted in FIG. 7, illustrating a second method for terminating the plug connector.

Referring to FIG. 12, a perspective view of plug connector 20 is shown, illustrating a second method for terminating wires 12 to plug connector 20. In this embodiment, plug 20 is equipped with leads 214 which are terminated to contacts 202 at the factory. During wire 12 termination, twist-on connector 212 is essentially screwed onto stripped wire 12.

Figure 13:
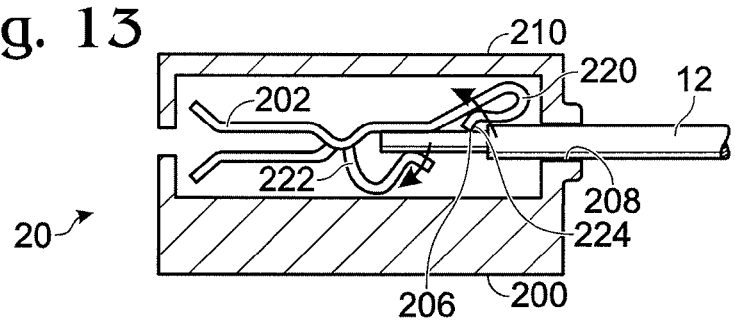
FIG. 13 is a perspective view of the plug connector depicted in FIG. 7, illustrating a third method for terminating the plug connector.

Referring to FIG. 13, a perspective view of plug connector 20 is shown, illustrating a third method for terminating wires 12 to plug connector 20. In this embodiment, each contact 202 in plug 20 is equipped with spring 220 and spring 222, which are configured to press one against the other before wire installation. When wire 12 is inserted into opening 208, spring 220 separates from spring 222. Spring 222 actuates trigger mechanism 224 which includes a metallic saw-tooth mechanism 206. Mechanism 206 bites into wire 12, securing it in place.

As those of ordinary skill in the art will recognize, the present invention is ideally suited for installing electrical wiring devices into any structure. During any installation, after the wires are placed between the breaker location to the location wherein the electrical device 30 is to be installed, wires 12 may be terminated to plug connector 20 using any of the methods described above. Subsequently, plug connector 20 is inserted into receptacle 306 of wiring device 30, to thereby establish electrical continuity between the electrical wiring device and the plurality of wires.

Figure 14:
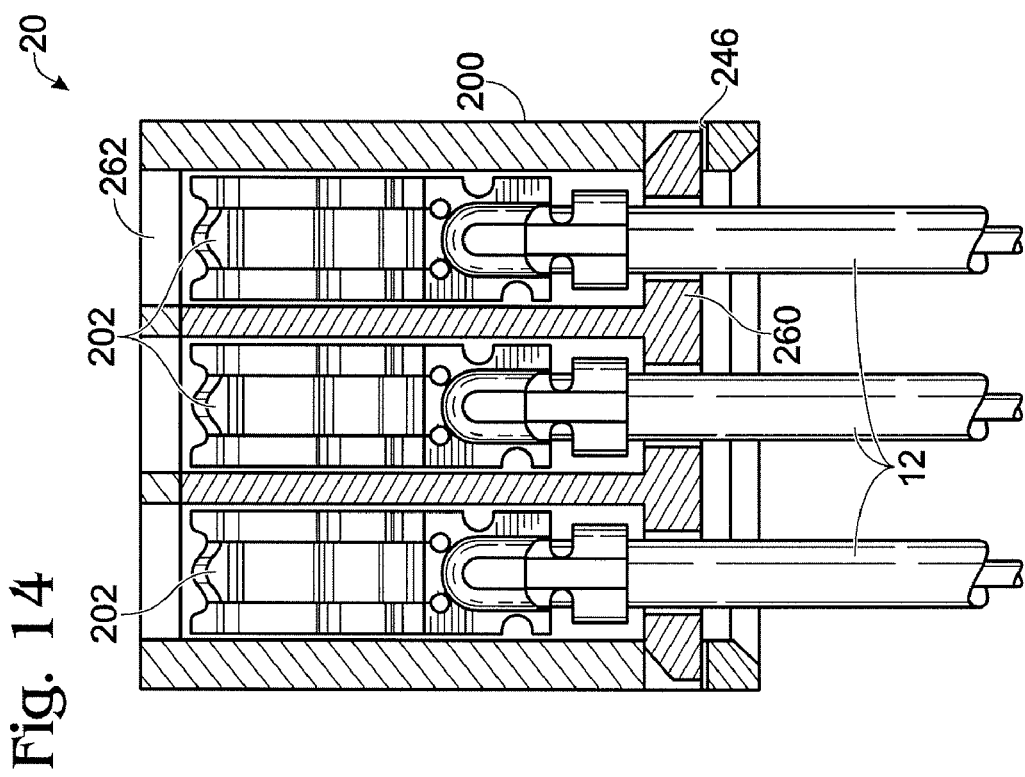
FIG. 14 is a cross-sectional view of the plug connector in accordance with an alternate embodiment of the present invention.

Referring to FIG. 14, a cross-sectional view of the plug connector 20 in accordance with an alternate embodiment of the present invention is disclosed. In this embodiment, plug connector 20 is arranged with plug contacts 202 adjacent one to the other within housing 200. Thus, contact openings 262 are likewise adjacent one to the other. Contact support member 260 is inserted into opening 264 of housing 200, to support contacts 202, which are terminated on wires 12.

Figure 15:
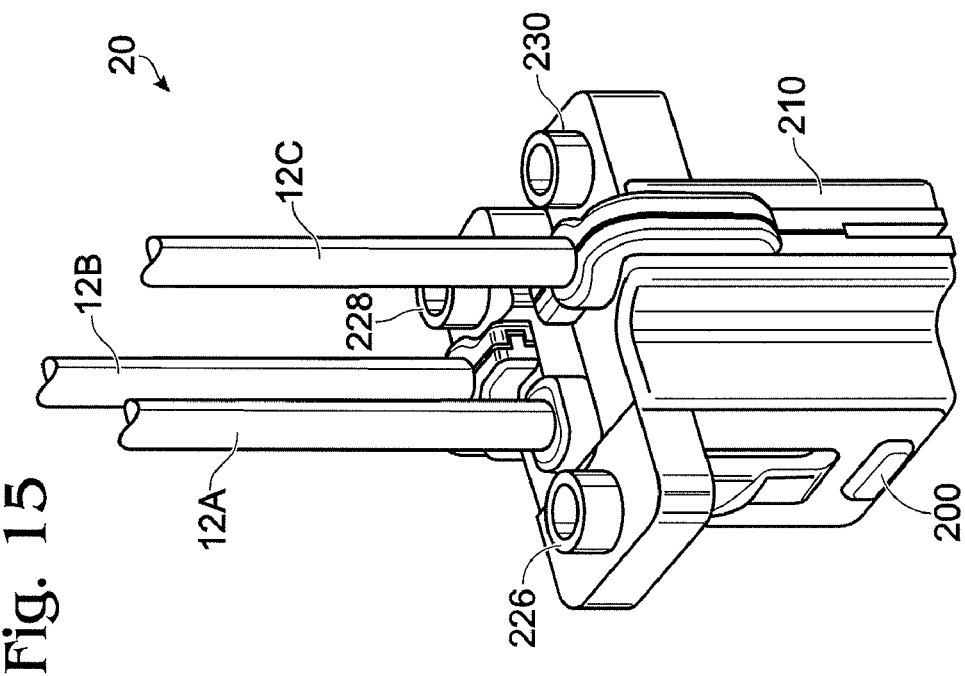
FIG. 15 is a perspective view of a feed-through plug connector in accordance with an embodiment of the invention.

Referring to FIG. 15, a perspective view of a feed-through plug connector in accordance with an embodiment of the invention is shown. As those of ordinary skill in the art will understand, often receptacles are daisy chained by way of feed through wires. In this embodiment, there is electrical connectivity between wire 12A and wire terminal 226, wire 12B and wire terminal 228, and wire 12C and wire terminal 230. Those of ordinary skill in the art will recognize that a feed through wire may be connected to terminal 226, 228, or 230 by any suitable means. For example, the feed-through wire may be connected to the wire terminal in a pre-assembled manner, such as that shown in FIG. 7. Terminals 226, 228, and 230 may be configured as twist-on terminals, as show in FIG. 12. Further, the method described in FIG. 13 may also be used to terminate feed-through wires to terminals 226, 228, and 230. Terminals 226, 228 and 230 can be included in connector plug 20. Alternatively, terminals 226, 228 and 230 can be in a second connector plug 20' that attaches to a receptacle 306' electrically coupled to wires 12A, 12B and 12C (not shown). Wires 12A, 12B, and 12C may couple electricity to wiring device 30 either through connector plug 20 or some alternate means such as screw terminals. In addition, connector plugs 20 and 20' may be configured so as to not be interchangeable.

Figure 16:
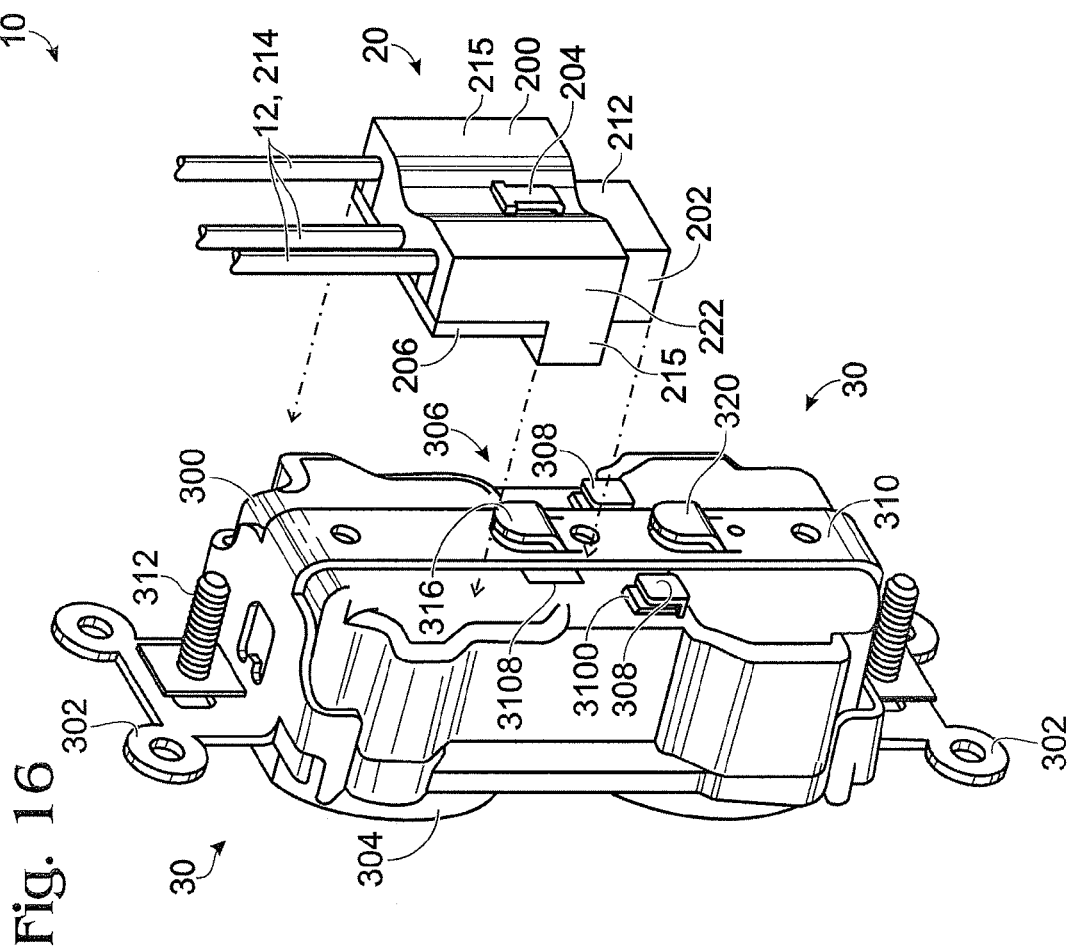
FIG. 16 is a perspective view of an electrical wiring system in accordance with another embodiment of the present invention.

As embodied herein and depicted in FIGS. 16-20, a perspective view of an electrical wiring system 10 in accordance with another embodiment of the present invention is disclosed. Again, the electrical wiring system 10 is configured for use in an electrical distribution system that includes electric circuits having electric power transmission wires/cables disposed between an electric power source interface, such as a power distribution panel, and various locations where electrical wiring devices are to be located within the structure. As depicted in FIG. 16, system 10 includes an electrical wiring device 30 that is configured to mate with slide-in connector assembly 20 at coupling area 306.

Figure 25:
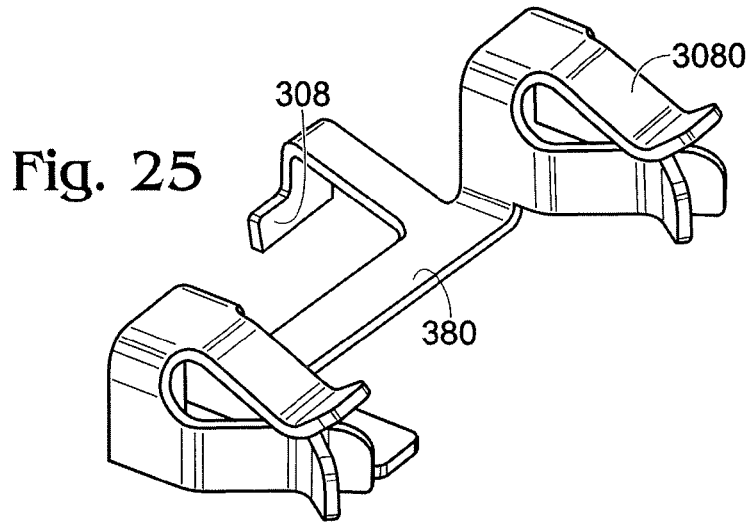
FIG. 25 is a perspective view of an electrical wiring device contact structure in accordance with the present invention.

The electrical wiring device 30 includes a rear body member 300 and a front body member 304. A ground strap 310 is disposed on a rear surface of rear body member 300. Ground strap 310 includes mounting straps 302 disposed at either end of the device 30. Mounting straps 302 are coupled to a wall box using fasteners 312. A ground contact 316 and a latching keeper 320 are formed in ground strap 310 along a central longitudinal axis of wiring device 30. A portion of the ground strap 310 extends into body member 300 via opening 3102. Hot and neutral wiring device contacts 308 are disposed in the coupling area 306 on either side of the central longitudinal axis of wiring device 30 in accordance with a connector assembly 20 geometry. Wiring device contacts 308 extend from the interior of rear body member 300 by way of openings 3100. Device contacts 308 may be integrally formed as a portion of a device contact structure as shown in FIG. 25.

Connector assembly 20 includes a connector body member 200 and a cover portion 206. The body portion 200, as well as cover 206, are formed having a central ground contact compartment 212 and exterior hot/neutral contact compartments 215. Connector contacts 202 (not explicitly shown in FIG. 16) are disposed in an interior portion of connector body 200 and accessible to wiring device contacts (308, 316) at a distal end of connector assembly 20. Connector assembly 20 is configured to be directly connected to the electric power transmission wires by way of wire leads 12 disposed at a proximal end of connector assembly 20, such that electrical continuity is established between the electric power transmission wires and connector contacts 202. As will be explained in greater detail below, connector assembly 20 is configured to be disposed in a contacting relationship within coupling area 306, such that electrical continuity is established between electrical connector contacts 202 and electrical wiring device contacts (308, 316).

Figure 17:
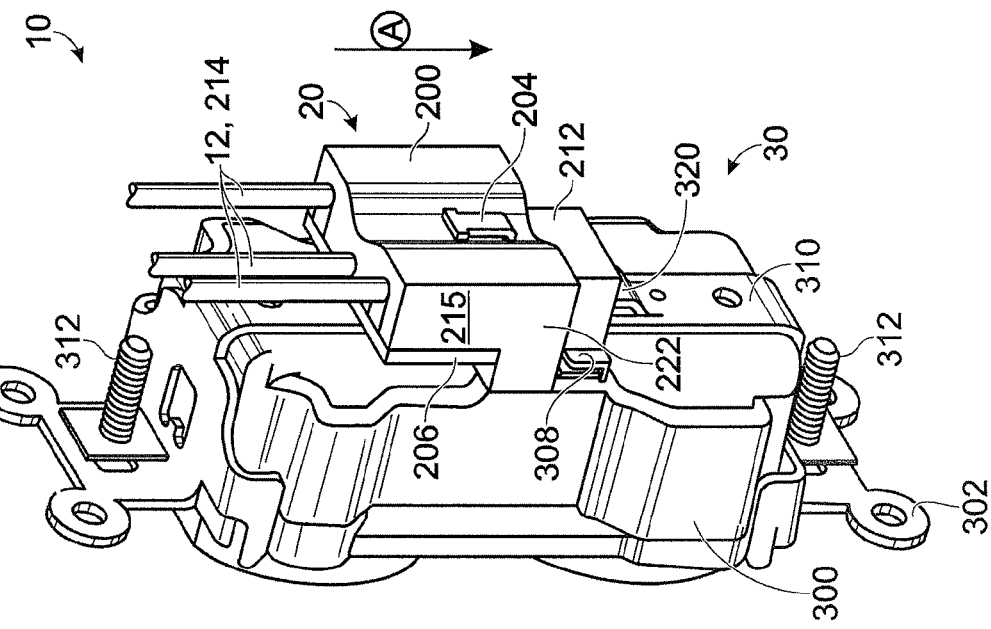
FIG. 17 is a perspective view of the electrical wiring system depicted in FIG. 16 in a registration position.

Referring to FIG. 17, a perspective view of the electrical wiring system 10 in a registration position is shown. As shown, connector assembly 20 includes a registration member 222. In the registration position, member 222 is configured to position and align the connector assembly 20 such that contacts (308, 316) are disposed in the notch formed by central compartment 212 and outer contact compartments 215. At this point, the connector cover portion 206 is disposed in a contacting face-to-face relationship against the rear major surface of device body member 300. Cover member 206 has a pocket 2060 (see FIG. 19A) formed in a central portion, the pocket being configured to accommodate ground contact 316. Connector 20 also includes contact apertures (not shown) formed in the distal ends of the ground compartment 212 and exterior hot and neutral compartments 215. The contact apertures are configured to accommodate the wiring device contacts (308, 316) and latch keeper 320. The contacts 202 disposed in connector 20 are configured to mate with the contacts (308, 316) disposed in the electrical wiring device 30 when connector 20 is slid in the direction shown by arrow "A".

FIG. 18 is a perspective view of the electrical wiring system 10 in a latched position. After connector 20 slides into the position shown, contacts 202 are engaged with contacts (308, 316) and latch mechanism 204 is similarly engaged and latched to keeper member 320. Note also that the registration member 222 slides over and covers wiring device contacts (308, 316) when the connector assembly 20 is disposed in the mated/latched position. The latching mechanism 204 is manually moveable to permit removal of the connector assembly 20 from wiring device 30. Latch 204 also provides an indication that the connector assembly 20 is in a locked position within the electrical wiring device 30. The locking indicator provides an audible "snap" indication as well as a visual indication.

FIGS. 19A-19B are plan views of the electrical wiring system 10 and illustrate connector assembly movement from the registered position to the latched/locked position. In particular, FIG. 19A shows connector 20 disposed in the registration position with ground contact 316 disposed in central pocket 2060. Hot and neutral contacts 308 and latch keeper 320 are juxtaposed to connector contacts 202 and latch 204 respectively. The system is locked by sliding connector 20 in the direction indicated. As shown in FIG. 19B, device contacts 308 slide into and mate with connector contacts 202. Similarly, ground contact 316 slides into and mates with anterior connector ground contact 202. Latch 204 extends over a rear portion of keeper 320 to lock the system in place. Again, registration members 222 covers the portion of contacts 308 that extend from body member 300 to eliminate any shock hazard.

FIG. 20 is a cross-sectional view of the electrical wiring system illustrating the latched position described above. In this view, the components typically disposed within the interior of wiring device 30 are omitted for clarity of illustration. Further, as those of ordinary skill in the art will appreciate, the device components and their arrangement within wiring device 30 necessarily differ in accordance with the device type. The wiring device of the present invention may be configured as a duplex outlet, a GFCI, an AFCI, a GFCI/AFCI combination device, a TVSS device, a lighting control device, and a combination device (e.g., a light switch/outlet combination, a light switch/GFCI combination, etc.).

Referring to FIG. 21A, an interior plan view of the cover portion 206 of the connector assembly 20 in accordance with an embodiment of the present invention is disclosed. The cover portion includes pocket aperture 2060 and snap connect elements 2062, 2064. The snap-connect elements 2062, 2064 mate with corresponding features disposed in connector body 200 and as those of ordinary skill in the art will appreciate, couple cover portion 206 to connector body 200.

Referring to FIG. 21B, a plan view of an internal portion of the body member 200 is shown. As noted previously, body member 200 includes a central ground contact compartment flanked by exterior hot and neutral contact compartments 215 on either side. The central ground contact compartment 212 includes a compartment 210 that accommodates a terminated ground wire segment 1200 as well as latch mechanism 204. The term "terminated ground wire segment" as used herein refers to a segment wire bonded to contact 202 using any of the methods and configurations disclosed in the instant specification. In other words, ground wire segment 1200 may be premise wiring (12) terminated in the field using any of the methods described herein, or a pre-stripped lead wire 214 configured to be connected to premise wiring 12 by way of a twist-on wire connector. The female contact shown in FIG. 21B is merely a representative example of one means for terminating a segment of wire with a contact. The hot and neutral compartments 215 include rib elements 230, 232 that are used to accommodate contacts 202 and wire segments 1202. Snap connect elements (not shown for clarity of illustration) are disposed in connector body 200 and mate with the snap connect elements 2062, 2064 disposed on cover 206. In this case, ground wire segments 1202 may be premise wiring (12) terminated in the field using any of the methods described herein, or a pre-stripped lead wires 214 configured to be connected to premise wiring 12 by way of twist-on wire connectors.

FIG. 22 is a side view of the connector assembly in accordance with the embodiments depicted in FIGS. 21A-21B. Cover 206 encloses contacts 202 within body 200. Snap connect elements 2062 are configured to snap into body 200 to capture hot/neutral wire segments 1202.

Figure 23A:
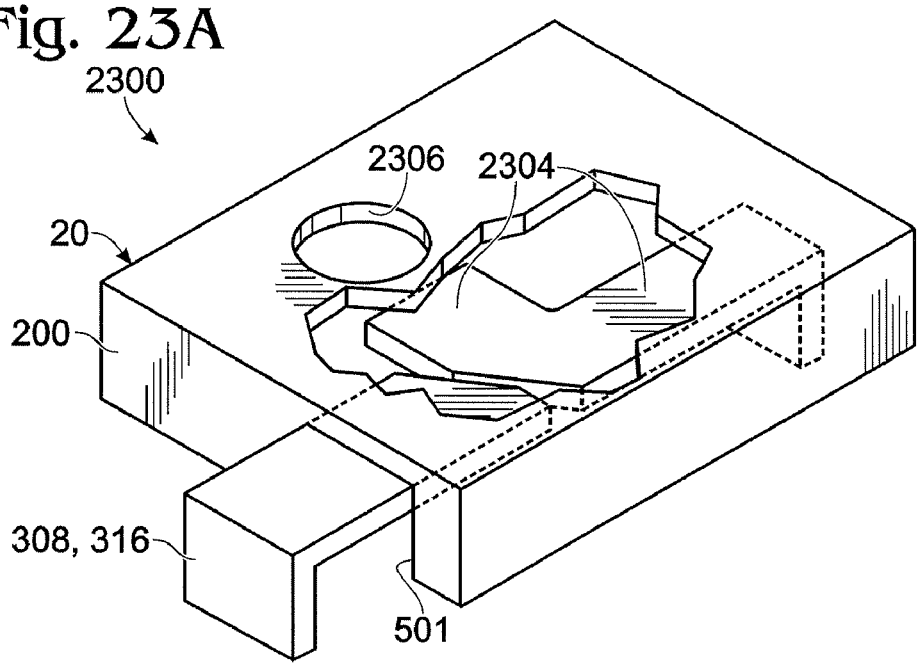
FIGS. 23A-B is a detail view of the latching mechanism in accordance with an embodiment of the present invention.
Figure 23B:
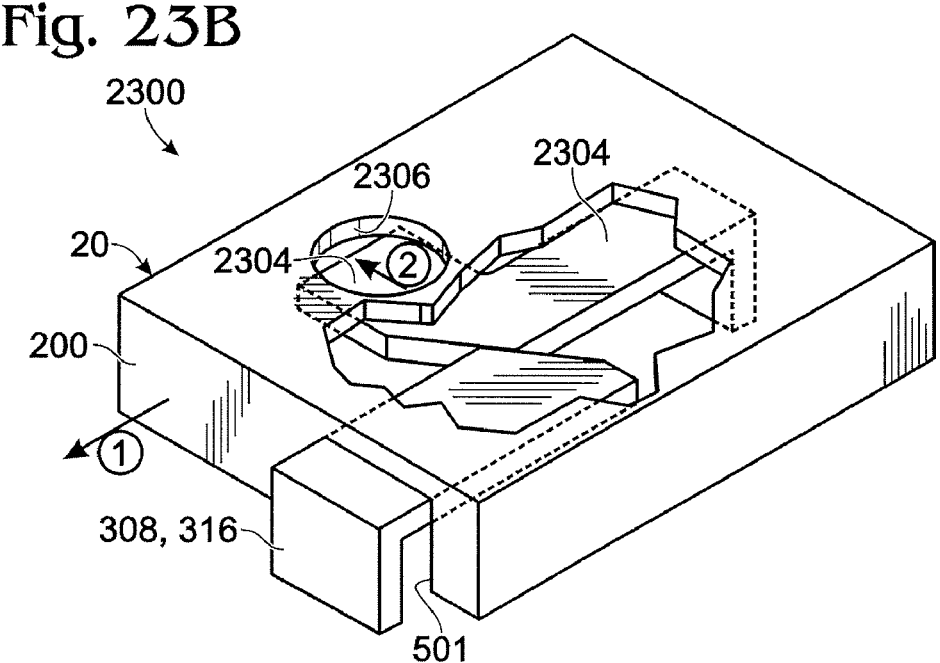

FIG. 23A and FIG. 23B are a detail views of a latching indication method in accordance with one embodiment of the present invention. Latching indicator 2300 is disposed in the plug connector body 200. Body 200 includes a passageway 501 for receiving wiring device contacts (308, 316) as the plug connector 20 is mated to the wiring device (indicated as direction "1"). At least one contact (308, 316) is configured to deflect a movable flag piece 2302 in direction "2". Flag piece 2302 had a colored region 2304 that is visible through a flag window 2306 when the plug connector is fully mated, referring to FIG. 23B. If the connector assembly is not fully mated, the movable flag piece is biased so that colored region 2304 is not visible through the window. Thus the visible presence or absence of the flag region shows the installer whether or not the connector assembly has mated. The pre-bias may be accomplished by making the flag piece flexible, or by utilizing a spring member (not shown) configured to bias the position of the flag piece. The bias may generate a snap action of the flag piece as it moves between the mated/non-mated positions. This snap action may produce an audible indication. In another aspect, flag region 2304 may include an indicia.

As embodied herein and depicted in FIG. 24A and FIG. 24B, a perspective view and side view, respectively, of a connector assembly 20 are disclosed. Assembly 20 includes connector contacts 202. Each contact 202 includes a wire receiving structure 2502 for establishing electrical connection with a wire 12 or a wire segment (214,1200). Movable beams 2504 apply force to the stripped end of the wire and are configured to resist the removal of the inserted wire. Contact 202 also includes a contact receiving structure 2506 for establishing electrical connection to a contact (308, 316) when connector 20 is mated to the wiring device. Once mated, the wire or wire segment is electrically connected to the wiring device by way of the connector contact. Structure 2506 is configured to allow withdrawal of the wiring device contact. The width (w) of the connector contact need only be about 50% of the diameter of the stripped wire end diameter (d). The height (h) of the connector contact need only be about 25% greater than the stripped wire diameter. The stripped wire diameter (d) ranges from about 0.040 to about 0.150 inches. Since the space available for connector 20 allows it to have an overall width (W) of up to 1.12 inches, as many as five wires can be disposed across the width of the connector. Since the space available for connector 20 allows it to have an overall height (H) dimension exceeding 0.500 inches, at least two rows of wires may be disposed in the plug's height dimension. Of course, the length (l) of wiring device contact (308,316) is increased in order for it to align with a wire disposed in the upper row. Wire 2508 illustrates that the wires need not be disposed in a single plane. As such, this connector embodiment lends itself to a large number of wires for accommodating two or three phase electrical power distribution systems, feed-through of power to a downstream electrical circuit, or low voltage circuits. Whatever the number of premise wires (or wire segments), since the plug and wiring device terminations take place on an outer surface of the wiring device housing, there is room inside the housing to accommodate the wiring device function itself.

In previous embodiments a ground wire and a keeper structure are disposed on the central axis of the wiring device housing. Of course, there are many wiring device configurations in which a ground strap does not wrap around the rear surface of the wiring device housing. The ground strap may be disposed substantially in a single plane that includes the mounting strap elements 302. The ground strap may connect ground strap elements 302 together but by wrapping around the perimeter of front cover 304. The wiring device may be configured for a two wire electrical distribution system that has a hot and neutral wires but no ground wire. Only the mounting strap elements are required and not a ground strap per se. Thus there are instances when the central wiring device contact and/or the keeper terminal positions do not have to be associated with the ground circuit. These positions on the major rear surface are free to accommodate other wires or wire segments.

The connector contacts may be electrically isolated from neighboring connector contacts by plastic walls disposed in body 200. Alternatively, two adjacent connector contacts can even be bonded together electrically. The wires (or wire segments) may be distributed among two or more connector assemblies that piggy-back together or that are disposed alongside each other.

Referring to FIG. 25, a perspective view of an electrical wiring device contact structure 380 in accordance with the present invention is disclosed. Contact structure 308 includes contact 308 as well face receptacle contact strictures 3080. As those of ordinary skill in the art will appreciate, the hot contact structure 308 and the neutral contact structure 308' may be configured as mirror images.

Figure 26:
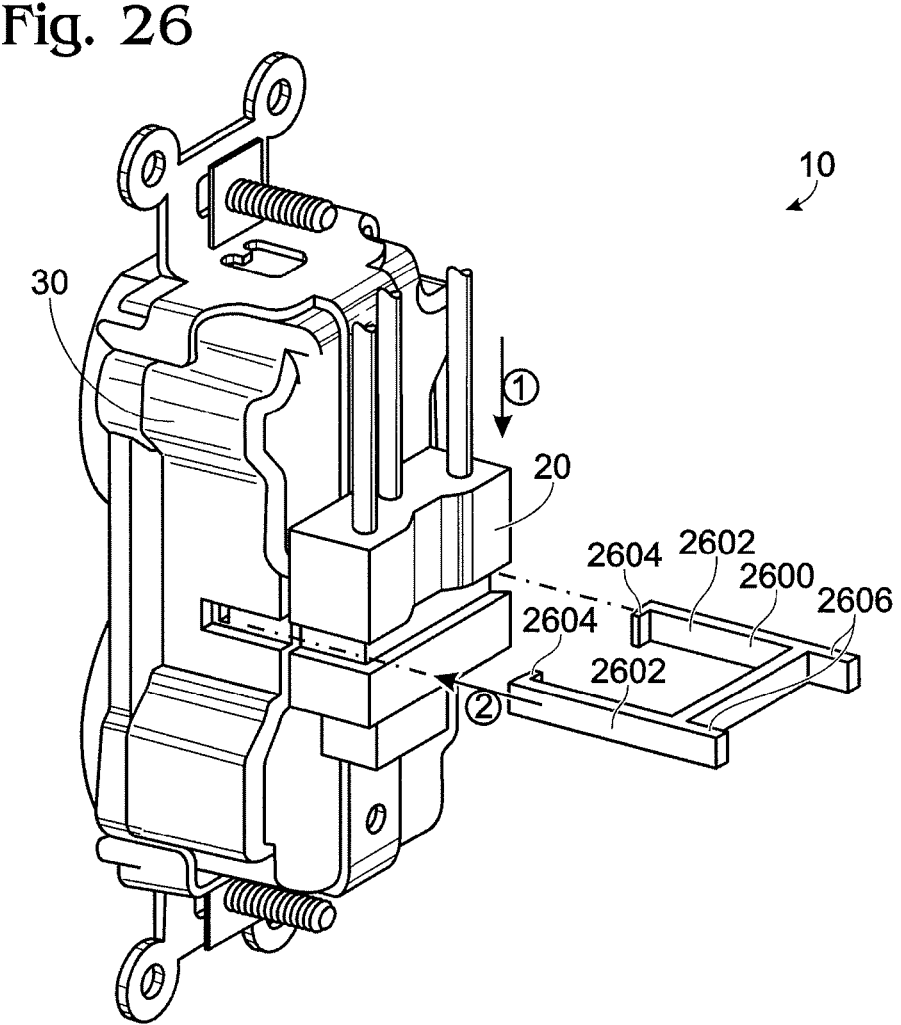
FIG. 26 is a perspective view of an electrical wiring system in accordance with another embodiment of the present invention.

Referring to FIG. 26, a detailed view of a latching mechanism in accordance with one embodiment of the present invention is shown. As has been described, system 10 includes an electrical wiring device 30 and a connector assembly 20. Once connector assembly 20 has been slid to roughly the mating position with wiring device 30, latch 2600 can be installed downwardly into recessed areas disposed in connector body 200 and wiring device body 300. Arms 2602 are deflected away from either of the bodies until ears 2604 align with pockets disposed in body 300, whereupon the arms snap inwardly, by which time the connector is properly mated. Thus latch 2600 provides a visible or audible indication when they snap inwardly. If there is ever a need to unplug the connector, a screwdriver tip can be used to deflect the arms away from each other, allowing the latch to move out of the locked position. A tool may be avoided if latch 2600 is provided with tabs 2606. The tabs are pinched together manually to release the latch member from the locked position. In another aspect, a support structure may be provided on body 200 (not shown) to prevent the complete separation of the latch member from the connector. Of course, the support structure configuration does not prevent the latch from performing its function. The support structure may include a flexible wall of plastic. A packet may be disposed in connector 20 to hold latch 2600 upwardly in the uploaded position.

Figure 27:
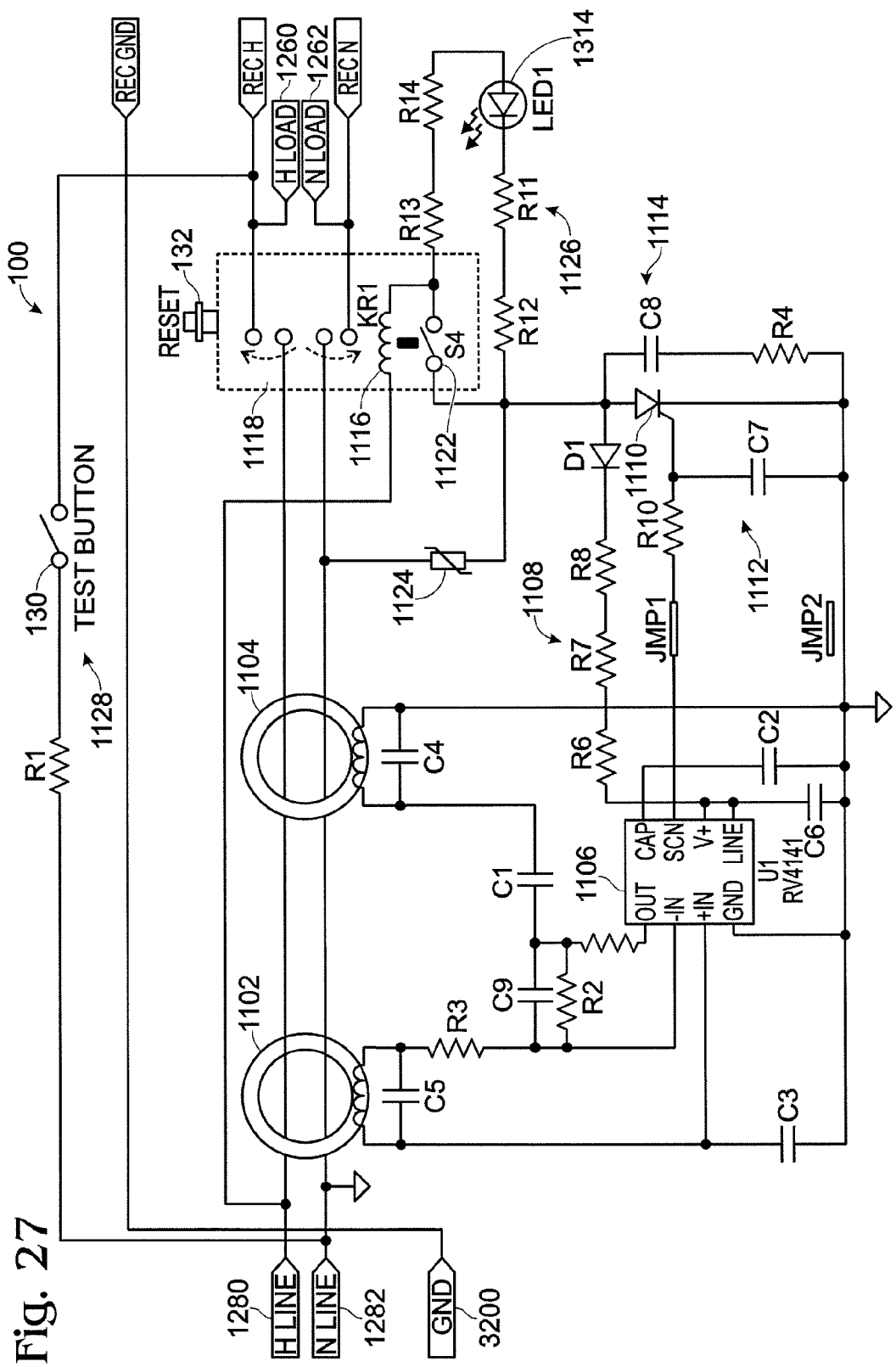
FIG. 27 is a schematic diagram of a GFCI in accordance with the present invention.

As embodied herein and depicted in FIG. 27, a schematic view of the protective circuit employed in the electrical wiring device of the present invention is disclosed. Moving from left to right in the schematic, it is seen that GFCI 100 includes hot line male terminal element 1280, neutral line receptacle blade 1282, and ground receptacle blade 3200. On the load side of device 12, there is hot load male terminal element 1260, neutral load male terminal element 1262 and a pair of user accessible receptacles, each including a hot receptacle terminal and a neutral receptacle terminal.

The ground fault circuitry includes a differential transformer 1102 which is configured to sense load-side ground faults. Transformer 1104 is configured as a grounded neutral transmitter and is employed to sense grounded-neutral fault conditions. Both transformers are disposed in toroid assembly L1. Both (LINE) conductors pass thru the sensors. Differential transformer 1104 senses currents from HOT to GROUND but not HOT to NEUTRAL. Both differential transformer 1102 and grounded-neutral transformer 1104 are coupled to detector integrated circuit 1106. Detector 1106 is powered by a power supply circuit 1108 connected to pin V+ on detector 1106. The detector output, provided on output pin SCR, is connected to the control input of SCR 110. Filter 1112, comprising resistor R10 and capacitor C7, low-pass filter the detector output signal. GFCI 100 also includes a snubber circuit 1114 that includes resistor R4 and capacitor C8. Snubber circuit 1114 prevents voltage transients from triggering SCR 1110.

When SCR 1110 is turned ON, solenoid 1116 is energized, actuating circuit interrupter 1118. Solenoid 1116 remains energized for a time period that is typically less than about 25 milliseconds. Circuit interrupter 1118 trips, resulting in the line terminals being disconnected from respective load terminals. After the fault condition has been eliminated, the circuit interrupter 1118 may be reset by way of reset button 132. In one embodiment, the reset mechanism actuated by reset button 132 is purely mechanical in nature and does not include any electrical contacts for test initiation.

GFCI 100 addresses certain end of life conditions by denying power to the load when the device is unable to function. As an example of an end-of-life condition, solenoid 1116 is susceptible to burn-out if SCR 1100 becomes shorted out, or is permanently turned ON. Solenoid 1116 may burn out if it is energized for more than about 1 second. Once the solenoid 1116 burns out, the circuit interrupter 1118 is incapable of being tripped. Solenoid burn-out prevention is provided by auxiliary switch 1122. Auxiliary switch 1122 is configured to open when the circuit interrupter 1118 is in the tripped position. If SCR 1110 is shorted out, or permanently ON, auxiliary switch 1122 ensures that solenoid 1116 is not permanently connected to a current source. The user may attempt to reset GFCI 100 by depressing the reset button 1120, but the circuit interrupter 1118 will immediately trip in response to the current flowing through the solenoid 1116. Because the trip mechanism 1118 is coupled to the auxiliary switch 1122, auxiliary switch 1122 is opened before solenoid 1116 burns out.

Another failure mode that is addressed by GFCI 100 relates to the end-of-life failure mode of movistor (MOV) 1124. MOV 1124 is disposed in series with auxiliary switch 1122 and trip solenoid 1116. This arrangement significantly reduces the probability of damage due to an over-current situation. When MOV 1124 reaches end-of-life and shorts out, trip solenoid 1116 is energized and auxiliary switch 1122 is opened. As previously described, when auxiliary switch 1122 opens, the flow of short circuit current is terminated before any damage to GFCI 100 ensues.

GFCI 100 also includes trip indication circuit 1126. Trip indicator 1126 is implemented by placing LED1 and series resistors (R11-R14) in parallel with auxiliary switch 1122. LED1 is configured to emit a visual signal when circuit interrupter 1118 and auxiliary switch 1122 are in an open state (tripped).

GFCI 100 also includes a test circuit 1128. The test circuit 1128 is coupled between the line neutral terminal 1282 and the hot receptacle terminal. The test circuit includes a test button 130 disposed in series with test resistor R1.

Figure 28:
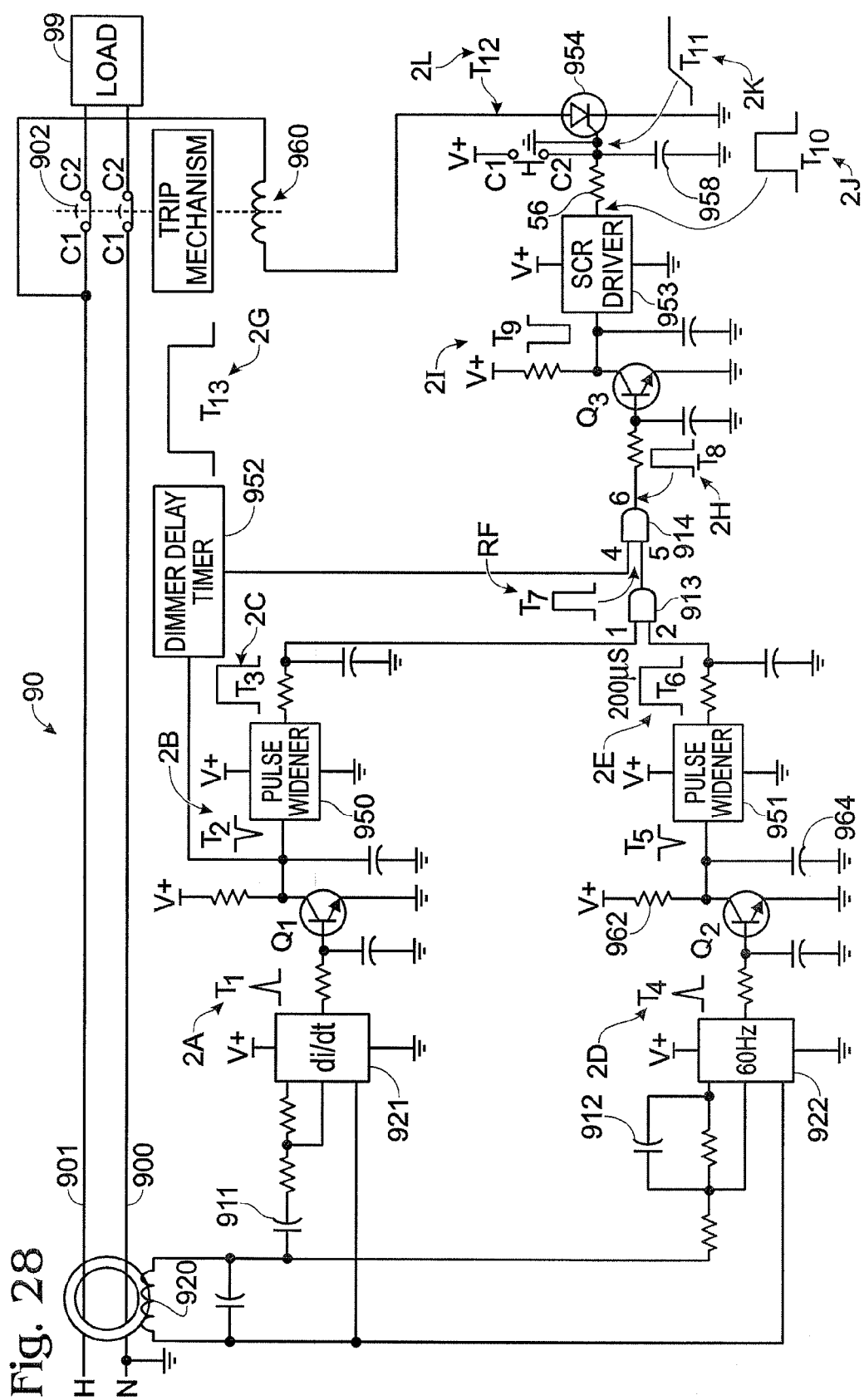
FIG. 28 is a schematic diagram of an AFCI in accordance with the present invention.

As embodied herein and depicted in FIG. 28, an arc fault circuit interrupter (AFCI) 90 is illustrated in schematic form in accordance with the present invention. AFCI 90 is formed from components that are readily available and that can be easily integrated into an electrical receptacle, plug, or in-line device. The circuit is designed so that it can be manufactured in the same form as ground fault circuit interrupter (GFCI) receptacle devices. AFCI 90 protects an electrical circuit which includes at least a neutral conductor 900 and a line conductor 901 connected to a power source (not shown). A ground conductor (not shown) is optionally present. AFCI 90 detects electrical arcs occurring between line conductor 901 and ground, neutral conductor 900 and ground should the power source be of reverse polarity, or line conductor 901 and neutral conductor 900.

A circuit interrupter 902 is connected in series with line conductor 901 between the power source and a load 99. This embodiment incorporates a first stage arc sensor 920, shown as a current transformer, which is configured to respond to the rate of change of neutral and/or line conductor current with respect to time. Sensor 920 may be designed with a physically small core of a type and number of secondary turns which gives optimum sensitivity during arcing. Either a single conductor (LINE) or both conductors can pass thru the sensor. The arc fault detector detects arcs that are either LINE to GROUND or LINE to NEUTRAL. Sensor 920 feeds two detector/amplifiers 921, 922. Detector/amplifiers 921, 922 are preferably RV4141A (Fairchild Semiconductor) low power ground fault interrupter ICs. Detector/amplifier 921, also referred to as the di/dt stage, has a high pass filter capacitor 911 on its input side, while detector/amplifier 922, also referred to as the 60 Hz or "threshold" stage, uses a low pass filter capacitor 912 in a feedback stage. The 60 Hz threshold detector 922 controls the level at which an arcing condition is to be detected, e.g., at a 75 Ampere or greater load current.

Figure 29:
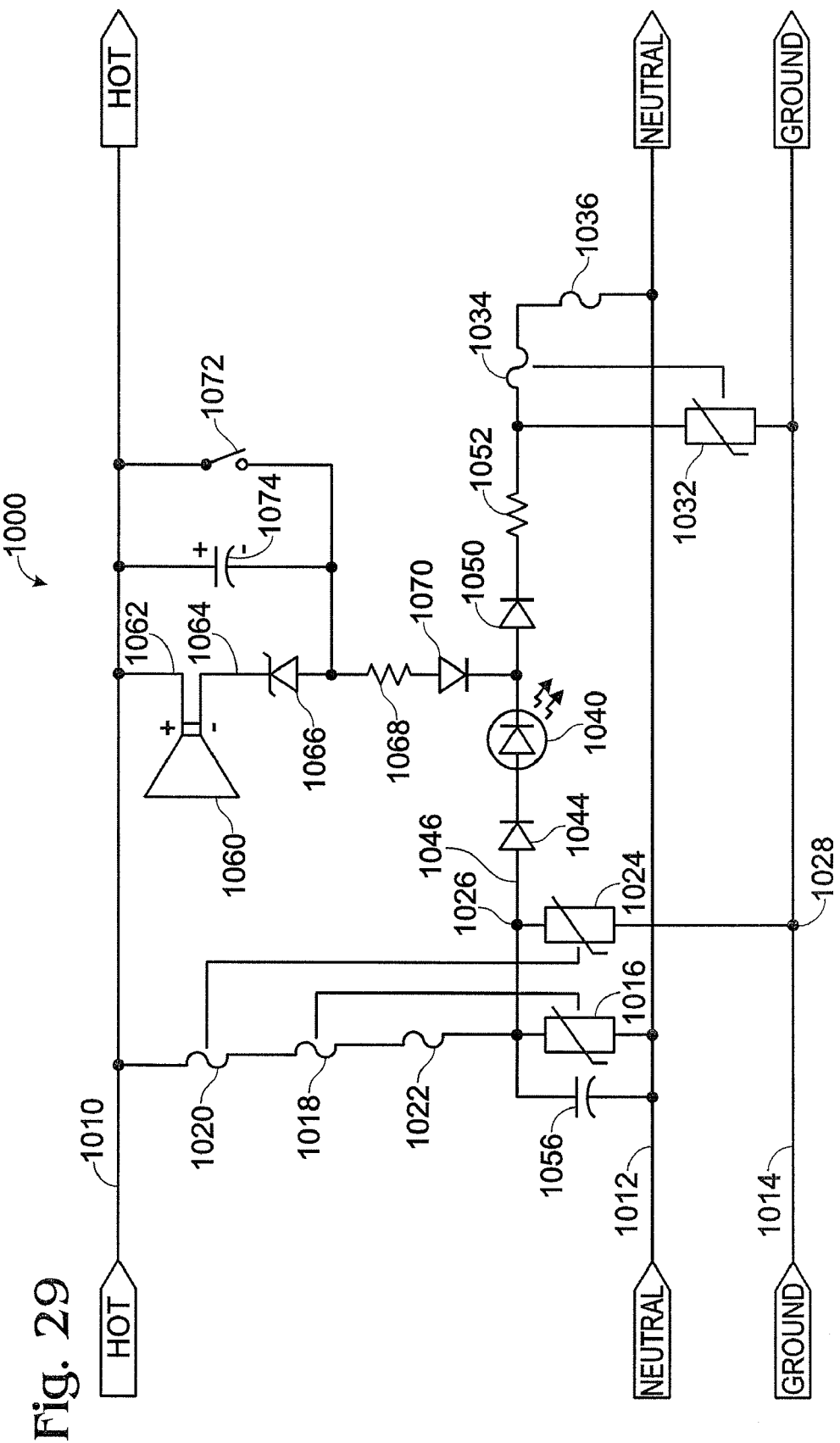
FIG. 29 is a schematic diagram of a TVSS in accordance with the present invention.

As embodied herein and depicted in FIG. 29, a transient voltage surge suppressor (TVSS) in accordance with the present invention is illustrated in schematic form. A TVSS, also known as a surge protective device (SPD), protects wiring or a load from overvoltages such as occur during lightning storms. TVSS 1000 is configured to protect a low voltage 120 VAC single phase electrical circuit. The circuit includes three conductors that for convenience are referred to herein as the hot 1010, neutral 1012, and ground 1014 conductors. Transient voltages are known to occur between any pair of two of these conductors, and surge suppression devices, such as metal oxide varistors, are arranged to absorb transient voltage surges between any pair of the conductors. Fuses are provided for disconnecting the surge suppression devices from the circuit in the event of failure. Two specific failure modes are provided for, over current failure and temperature failure.

A first metal oxide varistor 1016, such as a 150 volt RMS metal oxide varistor is connected in series with a first thermally responsive fuse 18, a second thermally responsive fuse 1020, and a conventional over current fuse 1022, and the series combination is connected between the hot conductor 1010 and the neutral conductor 1012. A second varistor 1024 of the same type is connected at one end 1026 in series with three fuses just mentioned, and the other end 1028 is connected to the ground conductor. These two varistors protect the hot-neutral and hot-ground pairs. Each of the thermally responsive fuses 1018, 1020 is positioned physically close to one of the varistors 1016, 1024, so that a rise in temperature of the varistor, as would be caused by a failure, causes the adjacent fuse to open. Since the two thermally responsive fuses 1018, 1020 are connected in series, the thermal failure of either of the varistors will cause the connection of both varistors to the hot conductor to be broken. A third metal oxide varistor 1032 is connected in series with another thermal fuse 1034, and an over current fuse 1036. The combination of the third varistor 1032 and the two fuses 1034, 1036 is connected between the neutral conductor 1012 and the ground conductor 1014. A thermal failure or an impedance failure of the third varistor device 1032 will cause one of the thermal fuse 1034 or the over current fuse 1036 to open, thereby disconnecting the varistor from the neutral-ground circuit.

A visible indicator, such as a light emitting diode 1040, is connected between the hot conductor 1010 and the neutral conductor, 1012 so that the light emitting diode 1040 is illuminated when all three of the varistors 1016, 1024, 1032 are functional, more particularly when none of the fuses 1018, 1020, 1022, 1034, 1036 is blown. A half wave rectifier diode 1044 has its cathode 1046 connected to the electrical conductor in series with the two thermal fuses 1018, 1020 and the over current fuse 1022, feeding the first two varistors 1016, 1024. The cathode of the rectifier diode 1044 is connected to one terminal of the light emitting diode 1040. The other terminal of the light emitting diode 1040 is connected through a blocking diode 1050 to a current limiting resistor 52, arranged in series, and then through the third thermal fuse 1034 and third over current fuse 1036 to the neutral electrical conductor 1012. A decoupling capacitor 1056 is preferably connected between the anode of the diode 1044 and the neutral conductor 1012.

When all of the fuses 1018, 1020, 1022, 1034 and 1036 are intact, that is when no fault has occurred, a circuit is created from the hot-conductor 1010 through the rectifier diode 1044, the light emitting diode 1040, the blocking diode 1050, the current limiting resistor 1052 and thence to the neutral conductor. The light emitting diode provides visible indication. If any of the three thermal fuses 1018, 1020, 1034 or two over current fuses opens 1022, 1036, the circuit is interrupted and the light emitting diode is extinguished, alerting a fault condition.

A TVSS 1000 in accordance with this invention also provides an audible indication of a fault in either of the varistors 1016, 1024 protecting the hot-neutral circuit or the hot-ground circuit respectively. A device, such as a simple buzzer 1060 or a piezoelectric device, has one terminal 1062 connected to the hot conductor 1010, and the other terminal 1064 connected by way of the series combination of a zener diode 1066, a current limiting resistor 1068, a first blocking diode 1070, second blocking diode 1050, second current limiting resistor 1052, the thermal fuse 1034, and the over current fuse 1036 to the neutral conductor 1012. The first and second thermal fuses 1018, 1020 and the first over current fuse 1022 are connected in series with rectifier diode 1044 and the light emitting diode 1040 between the hot electrical conductor 1010 and the junction of the two blocking diodes 1070, 1050 just mentioned, so that in normal operation no significant voltage passes through the buzzer, and the buzzer remains silent. If either of the varistors 1016, 1024 bridging the hot-neutral or hot-ground fails and any of the first and second thermal fuses 1018, 1020 and the first over current fuse 1022 is opened, voltage across the buzzer 1060 will cause it to sound.

In order to allow a user to deactivate the buzzer while awaiting repair, a normally open switch 1072 is connected effectively across the combination of the buzzer 1060 and the zener diode 1066. When the switch 1072 is closed, current through the buzzer 1060 is shunted through the switch and the buzzer is silenced. A capacitor 1074 is provided across the zener/audio alarm network to provide a DC voltage component to improve the audio alarm operating performance.

The buzzer deactivating switch 1072 is a simple normally open electrical switch, rather than a device that permanently deactivates the alarm 1060 or permanently interrupts a circuit trace. The switch 1072, once closed, can be opened at will and the buzzer 1060 reactivated. Accidentally deactivating the buzzer might destroy the audible alarm feature of the device permanently, and require its replacement even before it is installed. The use of a normally open switch in accordance with this invention eliminates this problem, and allows the alarm to be deactivated and reactivated.

As embodied herein and depicted in FIG. 30, a perspective view of the GFCI wiring device 10 depicted in FIG. 27 is shown. In this embodiment, wiring device 30 is a GFCI having a test button 130 and a reset button 132 disposed on the cover member 120. However, those of ordinary skill in the art will understand that wiring device 30 may be used to implement any type of wiring device apparatus such as a standard outlet receptacle device, an electrical switch device including one or more switches disposed on cover 120, a light dimmer device, a TVSS, an arc fault circuit interrupter (AFCI), occupancy sensors, temperature sensors, thermostats, a night light, combination devices such as a GFCI/night light combo, a receptacle/switch combo, etc.

GFCI 30 is shown as being disposed in a junction box coupled to slide-in connector 20. In this view, slide-in connector 20 includes wire segments coupled to premise wiring 12 via twist-on connectors.

As embodied herein and depicted in FIG. 31, another perspective view of the GFCI wiring device 10 depicted in FIG. 27 is shown. In this embodiment, slide-in connector 20 terminates the premise wires 12 directly. The premise wires 12, of course, extend from the panel box through the structure to the device junction box. As described herein, the present invention describes various ways of terminating premise wiring to the slide-in connector 20. FIG. 30 applies to the method wherein connector 20 wire leads are connected to premise wires by external connectors. Those of ordinary skill in the art will understand that the present invention contemplates the use of any suitable external connector. Non-limiting examples of such external connectors include twist-on connectors, push-on connectors, pressure connectors (i.e., push wires into terminal block having multiple holes), insulation displacement connectors, crimp-on connectors, solder/weld connectors, direct bearing set screw terminal, binding head terminals, terminal blocks, and/or panel board terminals (DIN Rail). Further, methods of connecting may include splicing, clamping, crimping, bonding, soldering, welding, etc. Once the connector is employed, it is stowed in the device box. FIG. 31 is directed to the methods disclosed herein where premise wires 12 are terminated to contact structures disposed within the slide-in connector or the plug connector.

Figure 32:
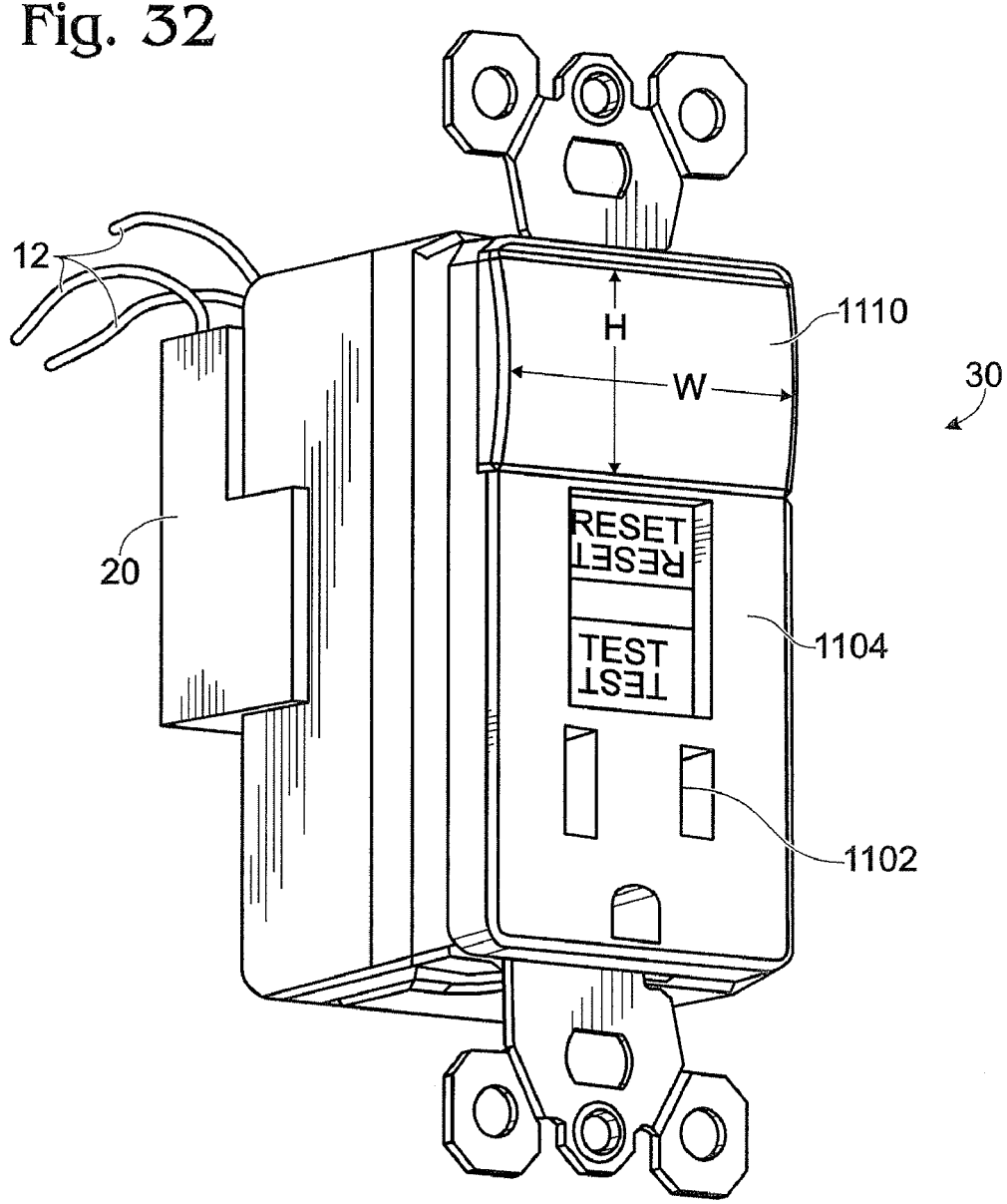
FIG. 32 is a perspective view of an electric wiring system in accordance with yet another embodiment of the present invention.

As embodied herein and depicted in FIG. 32, a GFCI/Light combination device 1100 is disclosed. The electrical wiring device 1100 includes a cover member 1104 coupled to a rear body portion 1106. The form factor of rear body member 1106 is substantially identical to the wiring device depicted in FIG. 1A, 1B, and FIG. 16. Wiring device 1100 includes a GFCI circuit of the type disclosed in FIG. 27, and a light source disposed under lens cover 1110. In an aspect of the embodiment, the light source functions as a pilot light by illuminating the ambient environment surrounding the electrical wiring device. The light source is connected to the line terminal elements in this embodiment. Accordingly, the light source is continuously energized as long as power is being provided to the device. Slide-in connector 20 is shown coupled to device 30 by way of the manner previously described. The premise wiring 12 is terminated inside slide-in connector 20. However, those of ordinary skill in the art will understand that the twist-on connector termination method is equally applicable to the embodiment of FIG. 32.

The light source 1110 may also function as a circuit status indicator when connected to the load terminal elements. The light is, therefore, energized when device 1100 is in the reset state and the light is OFF when the GFCI is tripped. The light source may be implemented using any suitable device, such as an LED. However, the light source may be implemented using a neon source, an incandescent source, etc.

The light source may be implemented using a single-element light source or a multi-element light source as shown. For example, twin LEDs may be disposed under lens cover 1110. Those of ordinary skill in the art will understand that the wavelength of the illumination produced by the light source will depend on the type of source used, and may be selected as a function of the task being performed by the light source; e.g., a night-light, a status indicator, a room illuminator, etc.

Those of ordinary skill in the art will also understand that the lens cover 1110 may be made of a either a clear or a translucent material in accordance with design factors such as the type of light source, the wavelength radiated by the light source, the desired intensity, or softness, of the illumination, the function of the light, and other considerations. The lens cover 1110 may be removable from the housing cover 1104 for access to the light source.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

What is claimed is:

1. An electrical wiring system for use in an electrical distribution system including at least one electric circuit, the at least one electric circuit including a plurality of electric power transmitting wires disposed between an electric power source interface and at least one electrical device location, the system comprising:

an electrical wiring device disposed at the at least one electrical device location, the electrical wiring device including a predefined coupling area having a plurality of electrical wiring device contacts disposed therein; and a connector assembly including a plurality of electrical connector contacts disposed therein, the connector assembly being configured to be directly connected to the plurality of electrical power transmitting wires such that electrical continuity is established between the plurality of electrical power transmitting wires and the plurality of electrical connector contacts, the connector assembly also being configured to be disposed in a contacting relationship with the predefined coupling area of the electrical wiring device such that electrical continuity is established between the plurality of electrical connector contacts and the plurality of electrical wiring device contacts.

2. The system of claim 1, wherein the predefined coupling area is an exterior substantially planar region disposed on a rear surface of the electrical wiring device.

3. The system of claim 2, wherein the plurality of electrical wiring device contacts are disposed in the exterior substantially planar region.

4. The system of claim 3, wherein the electrical wiring device includes a neutral contact structure and a hot contact structure disposed within the electrical wiring device, the plurality of electrical wiring device contacts including a neutral wiring device contact coupled to the neutral contact structure and a hot wiring device contact coupled to the hot contact structure.

5. The system of claim 4, wherein the rear surface accommodates a ground strap structure, and the plurality of electrical wiring device contacts includes at least one ground contact formed in the ground strap structure.

6. The system of claim 2, wherein the connector assembly is configured to cover at least one of the wiring device contacts if there is electrical continuity between the wiring device contact and the corresponding electrical connector contact.

7. The system of claim 2, wherein the connector assembly includes a covering element that is configured to prevent human contact of at least one of the electrical connector contacts.

8. The system of claim 2, wherein the connector assembly, in the contacting relationship, is configured to slide along the exterior substantially planar region from an initial predefined coupling area position to a second predefined coupling area position whereby the plurality of electrical connector contacts are mated with the plurality of electrical wiring device contacts.

9. The system of claim 8, wherein the connector assembly further comprises a registration member configured to position and align the connector assembly in the initial predefined coupling area position when the connector assembly is disposed in the contacting relationship with the electrical wiring device.

10. The system of claim 9, wherein the registration member and/or the connector assembly is configured to cover the plurality of electrical wiring device contacts when the connector assembly is disposed in the second predefined coupling area position.

11. The system of claim 8, wherein the connector assembly further comprises a latch configured to mate with a keeper mechanism disposed on the electrical wiring device when the connector assembly is disposed in the second predefined coupling area position.

12. The system of claim 1, wherein the predefined coupling area is a receptacle having the plurality of electrical wiring device contacts disposed therein, the receptacle being configured to receive the connector assembly in the contacting relationship such that electrical continuity is established between the plurality of electrical connector contacts and the plurality of electrical wiring device contacts.

13. The system of claim 12, wherein the plurality of electrical wiring device contacts comprise female receptacle contacts.

14. The system of claim 13, wherein the plurality of electrical connector contacts comprises male contact elements.

15. The system of claim 12, wherein the plurality of electrical wiring device contacts comprise male receptacle contacts.

16. The system of claim 15, wherein the plurality of electrical connector contacts comprises female contact elements.

17. The system of claim 1, further comprising a latching apparatus configured to prevent the connector assembly from being removed from the electrical wiring device to thereby ensure that electrical continuity is maintained between the plurality of electrical connector contacts and the plurality of electrical wiring device contacts.

18. The system of claim 17, wherein the latching apparatus includes a latching mechanism disposed on the connector assembly and a keeper structure disposed on the electrical wiring device, the latching mechanism being configured to mate with the keeper structure when the plurality of electrical connector contacts mate with the plurality of electrical wiring device contacts.

19. The system of claim 18, wherein the keeper structure is formed from a portion of a ground strap structure disposed on the rear major surface of the electrical wiring device.

20. The system of claim 18, wherein the latching mechanism is manually moveable to permit removal of the connector assembly from the electrical wiring device.

21. The system of claim 18, wherein the latching mechanism provides an indication that the connector assembly is in a locked position within the electrical wiring device.

22. The system of claim 21, wherein the indication includes an audible indication.

23. The system of claim 21, wherein the indication includes a visual indication.

24. The system of claim 1, wherein the predefined coupling area is a relatively planar area disposed on a rear major surface of the electrical wiring device.

25. The system of claim 1, wherein the connector assembly further comprises a registration member configured to position and align the connector assembly in the predefined coupling area.

26. The system of claim 1, wherein the connector assembly further comprises a plurality of feed-through terminal ports in electrical communication with the plurality of electrical connector contacts, each of the plurality of feed-through terminal ports being configured to accommodate one of a plurality of feed-through wires, the plurality of feed-through wires being disposed in the electrical distribution system down stream from the at least one electrical device location.

27. The system of claim 1, wherein the electrical wiring device includes at least one electrical wiring device apparatus selected from a group of electrical wiring device apparatuses comprising an electrical face receptacle configured to accept a power plug coupled to an electrical load, an electrical switch, a GFCI, an AFCI, a lighting device, a sensor device, a transient voltage surge suppressor, an environmental regulation device, and/or a timer device.

28. A method for installing an electrical wiring system for use in an electrical distribution system including at least one electric circuit, the at least one electric circuit including a plurality of electric power transmitting wires disposed between an electric power source interface and at least one electrical device location, the method comprising:

disposing an electrical wiring device at the at least one electrical device location, the electrical wiring device including a predefined coupling area having a plurality of electrical wiring device contacts disposed therein;

providing a connector assembly including a plurality of electrical connector contacts disposed therein;

directly connecting the connector assembly to the plurality of electrical power transmitting wires such that electrical continuity is established between the plurality of electrical power transmitting wires and the plurality of electrical connector contacts; and positioning the connector assembly in a contacting relationship with the predefined coupling area of the electrical wiring device to thereby establish electrical continuity between the plurality of electrical connector contacts and the plurality of electrical wiring device contacts.

29. The method of claim 28, wherein the predefined coupling area is an exterior substantially planar region disposed on a surface of the electrical wiring device, and wherein the plurality of electrical wiring device contacts are disposed in the exterior substantially planar region.

30. The method of claim 29, wherein the electrical wiring device includes a neutral contact structure and a hot contact structure disposed within the electrical wiring device, the plurality of electrical wiring device contacts including a neutral wiring device contact coupled to the neutral contact structure and a hot wiring device contact coupled to the hot contact structure.

31. The method of claim 29, wherein the surface accommodates a ground strap structure, and the plurality of electrical wiring device contacts includes at least one ground contact formed in the ground strap structure.

32. The method of claim 28, wherein the step of positioning further comprises:

positioning the connector assembly in an initial position within the predefined coupling area; and sliding the connector assembly from the initial position to a second position in the predefined coupling area, whereby the plurality of electrical connector contacts are mated with the plurality of electrical wiring device contacts.

33. The method of claim 32, wherein the connector assembly further comprises a registration member and the step of positioning the connector assembly in an initial position within the predefined coupling area further comprises:

aligning the registration member with the initial position; and positioning the connector assembly in the predefined coupling area to establish the contacting relationship with the electrical wiring device.

34. The method of claim 33, wherein the registration member and/or the connector assembly cover the plurality of electrical wiring device contacts when the connector assembly is disposed in the second predefined coupling area position.

35. The method of claim 28, further comprising the step of latching the connector assembly to the electrical wiring device to thereby prevent the connector assembly from being removed from the electrical wiring device after electrical continuity is established between the plurality of electrical connector contacts and the plurality of electrical wiring device contacts.

36. The method of claim 35, wherein the step of latching is effected by a latching apparatus that includes a latching mechanism disposed on the connector assembly and a keeper structure disposed on the electrical wiring device, the latching mechanism being configured to mate with the keeper structure when the plurality of electrical connector contacts mate with the plurality of electrical wiring device contacts.

37. The method of claim 36, wherein the latching mechanism provides an indication that the connector assembly is locked within the electrical wiring device.

38. The method of claim 37, wherein the indication includes an audible indication.

39. The method of claim 37, wherein the indication includes a visual indication.

40. The method of claim 35, further comprising the step of manipulating manually and/or with the aid of a tool the latching mechanism to permit removal of the connector assembly from the electrical wiring device.

41. The method of claim 28, wherein the step of positioning the connector assembly in a contacting relationship with the predefined coupling area of the electrical wiring device includes the step of inserting the connector assembly into a receptacle stricture disposed in the predefined coupling area, the receptacle being configured to receive the connector assembly in the contacting relationship such that electrical continuity is established between the plurality of electrical connector contacts and the plurality of electrical wiring device contacts.

42. The method of claim 41 wherein the plurality of electrical wiring device contacts comprise female receptacle contacts and the plurality of electrical connector contacts comprises male contact elements.

43. The method of claim 41, wherein the plurality of electrical wiring device contacts comprise male receptacle contacts and the plurality of electrical connector contacts comprises female contact elements.

44. The method of claim 28, wherein the connector assembly further comprises a plurality of feed-through terminal ports in electrical communication with the plurality of electrical connector contacts.

45. The method of claim 44, further comprising the step of inserting one of a plurality of feed-through wires into a corresponding one of the plurality of feed-through terminal ports, the plurality of feed-through wires being disposed in the electrical distribution system down stream from the at least one electrical device location.

46. An electrical wiring system for use in an electrical distribution system including at least one electric circuit, the at least one electric circuit including a plurality of electric power transmitting wires having a first end portion connected to an electric power source interface and a second end portion disposed at least one electrical device location, a device box having a wiring egress aperture and an interior volume being disposed at the at least one electrical device location, the system comprising:

an electrical wiring device configured to be mounted on the device box, the electrical wiring device including a predefined coupling area having a plurality of electrical wiring device contacts disposed therein; and a connector assembly including a plurality of electrical connector contacts disposed therein, the connector assembly being configured to be connected to the second end portion of the plurality of electrical power transmitting wires such that electrical continuity is established between the plurality of electrical power transmitting wires and the plurality of electrical connector contacts, the connector assembly also being configured to be disposed in a contacting relationship with the predefined coupling area of the electrical wiring device such that electrical continuity is established between the plurality of electrical connector contacts and the plurality of electrical wiring device contacts, the second end portion extending through the wiring egress aperture into the interior volume and not connected to the device box.

47. The system of claim 46, wherein the plurality of electrical connector contacts include a plurality of stripped wire leads extending therefrom, the plurality of stripped wire leads being configured to be connected to the second end portion by way of connectors configured to be stowed in the interior volume after the plurality of stripped wire leads are connected to the second end portion.

48. The system of claim 46, wherein the second end portion of the plurality of electrical power transmitting wires are directly terminated to corresponding ones of the plurality of electrical connector contacts.

49. An electrical wiring system for use in an electrical distribution system including at least one electric circuit, the at least one electric circuit including a plurality of premise wires disposed between an electric power source interface and at least one electrical device location, the system comprising:
an electrical wiring device disposed at the at least one electrical device location, the electrical wiring device including a predefined coupling area having a plurality of electrical wiring device contacts disposed therein; and
a connector assembly including a plurality of electrical connector contacts disposed therein, the connector assembly being configured to be directly connected to each of the plurality of premise wires at corresponding connection points such that electrical continuity is established between the plurality of premise wires and the plurality of electrical connector contacts, the connector assembly also being configured to be disposed in a contacting relationship with the predefined coupling area of the electrical wiring device such that electrical continuity is established between the plurality of electrical connector contacts and the plurality of electrical wiring device contacts.

50. The system of claim 49, wherein the electrical wiring device is configured to be mounted to a device box at an open faced portion thereof, the device box further including a wiring egress aperture disposed in at least one wall portion of the device box, the at least one wall portion defining an interior volume.

51. The system of claim 50, wherein the plurality of premise wires extend through the wiring egress aperture and the corresponding connection points are disposed in the interior volume of the device box.

52. The system of claim 49, wherein the plurality of electrical connector contacts include a plurality of stripped wire leads extending therefrom, the plurality of stripped wire leads being configured to be connected to the plurality of premise wires via connector elements not fixed relative to the at least one electrical device location.

53. The system of claim 49, wherein the plurality of premise wires are directly terminated to corresponding ones of the plurality of electrical connector contacts.

54. An electrical wiring system for use in an electrical distribution system including at least one electric circuit, the at least one electric circuit including a plurality of electric power transmitting wires having a first end portion connected to an electric power source interface and a second end portion disposed at least one electrical device location, a device box having a wiring egress aperture and an interior volume being disposed at the at least one electrical device location, the system comprising:
an electrical wiring device configured to be mounted on the device box, the electrical wiring device including a predefined coupling area having a plurality of electrical wiring device contacts disposed therein; and
a connector assembly including a plurality of electrical connector contacts disposed therein, the connector assembly being configured to be directly connected to the plurality of electrical power transmitting wires such that electrical continuity is established between the plurality of electrical power transmitting wires and the plurality of electrical connector contacts within the interior volume, the connector assembly also being configured to be disposed in a contacting relationship with the predefined coupling area of the electrical wiring device such that electrical continuity is established between the plurality of electrical connector contacts and the plurality of electrical wiring device contacts.

55. The system of claim 54, wherein the plurality of electrical connector contacts include a plurality of stripped wire leads extending therefrom, the plurality of stripped wire leads being configured to be connected to the second end portion by way of connectors configured to be stowed in the interior volume after the plurality of stripped wire leads are connected to the second end portion.

56. The system of claim 54, wherein the second end portion of the plurality of electrical power transmitting wires are directly terminated to corresponding ones of the plurality of electrical connector contacts.

57. An electrical wiring system for use in an electrical distribution system including at least one electric circuit, the at least one electric circuit including a plurality of electric power transmitting wires disposed between an electric power source interface and at least one electrical device location, the system comprising:
an electrical wiring device disposed at the at least one electrical device location, the electrical wiring device including a predefined coupling area having a plurality of electrical wiring device contacts disposed therein; and
a connector assembly including a plurality of electrical connector contacts disposed in an interior portion of the assembly and a plurality of wire leads connected to the plurality of electrical connector contacts and extending to an exterior portion of the connector assembly, the plurality of wire leads disposed at the exterior portion being configured to be connected to corresponding wires of the plurality of electrical power transmitting wires at corresponding connection points such that electrical continuity is established between the plurality of electrical power transmitting wires and the plurality of electrical connector contacts, the connector assembly also being configured to be disposed in a contacting relationship with the predefined coupling area of the electrical wiring device such that electrical continuity is established between the plurality of electrical connector contacts and the plurality of electrical wiring device contacts.

58. The system of claim 57, wherein the electrical wiring device is configured to be mounted to a device box at an open faced portion thereof, the device box further including a wiring egress aperture disposed in at least one wall portion of the device box, the at least one wall portion defining an interior volume.

59. The system of claim 58, wherein the plurality of electrical power transmitting wires extend through the wiring egress aperture and the corresponding connection points are disposed in the interior volume of the device box and not mechanically fixed to the device box.

60. An electrical wiring system for use in an electrical distribution system including at least one electric circuit, the at least one electric circuit including a plurality of electric power transmitting wires disposed between an electric power source interface and at least one electrical device location, the system comprising:
an electrical wiring device disposed at the at least one electrical device location, the electrical wiring device including a predefined coupling area having a plurality of electrical wiring device contacts disposed therein being disposed on a major rear surface of the electrical wiring device; and a connector assembly including a plurality of electrical connector contacts disposed therein, the connector assembly being configured to be directly connected to the plurality of electrical power transmitting wires such that electrical continuity is established between the plurality of electrical power transmitting wires and the plurality of electrical connector contacts, the connector assembly also being configured to be disposed in a contacting relationship with the predefined coupling area of the electrical wiring device such that electrical continuity is established between the plurality of electrical connector contacts and the plurality of electrical wiring device contacts.

* * * * *

UNITED STATES PATENT AND TRADEMARK OFFICE
CERTIFICATE OF CORRECTION

| | |
|---|---|
| PATENT NO. | : 7,510,429 B1 |
| APPLICATION NO. | : 11/678283 |
| DATED | : March 31, 2009 |
| INVENTOR(S) | : Savicki et al. |

It is certified that error appears in the above-identified patent and that said Letters Patent is hereby corrected as shown below:

Please correct the typograpical error as follows:

column 22, claim 41, line 9, replace "stricture" with "structure"

Signed and Sealed this

Twenty-third Day of June, 2009

JOHN DOLL
*Acting Director of the United States Patent and Trademark Office*